(12) United States Patent
Park et al.

(10) Patent No.: US 11,297,266 B2
(45) Date of Patent: Apr. 5, 2022

(54) ELECTRONIC DEVICE AND METHOD FOR OBTAINING DATA FROM SECOND IMAGE SENSOR BY MEANS OF SIGNAL PROVIDED FROM FIRST IMAGE SENSOR

(71) Applicant: Samsung Electronics Co., Ltd., Gyeonggi-do (KR)

(72) Inventors: Minyoung Park, Seoul (KR); Hwayong Kang, Gyeonggi-do (KR); Dongsoo Kim, Gyeonggi-do (KR); Sangmin Lee, Gyeonggi-do (KR); Hyeoncheol Jo, Gyeonggi-do (KR); Youngkwon Yoon, Seoul (KR); Jonghoon Won, Gyeonggi-do (KR); Kihuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 16/642,472

(22) PCT Filed: Jul. 27, 2018

(86) PCT No.: PCT/KR2018/008510
§ 371 (c)(1),
(2) Date: Feb. 27, 2020

(87) PCT Pub. No.: WO2019/054626
PCT Pub. Date: Mar. 21, 2019

(65) Prior Publication Data
US 2020/0204747 A1    Jun. 25, 2020

(30) Foreign Application Priority Data
Sep. 15, 2017 (KR) .................. 10-2017-0118921

(51) Int. Cl.
*H04N 5/225* (2006.01)
*H04N 5/235* (2006.01)
(Continued)

(52) U.S. Cl.
CPC ........... *H04N 5/353* (2013.01); *H04N 5/2258* (2013.01); *H04N 5/2351* (2013.01);
(Continued)

(58) Field of Classification Search
CPC .. H04N 5/2258; H04N 5/2351; H04N 5/2353; H04N 5/347; H04N 5/353; H04N 5/378
See application file for complete search history.

(56) References Cited

U.S. PATENT DOCUMENTS 8,497,932 B2 * 7/2013 Morimoto ............ H04N 5/2258
348/362
10,841,478 B2 * 11/2020 Mitsubayashi ...... H04N 5/2258
(Continued)

FOREIGN PATENT DOCUMENTS

CN     103475887 A    12/2013
EP     1 189 460 A2    3/2002
(Continued)

OTHER PUBLICATIONS

Korean Search Report dated Jul. 9, 2021.

*Primary Examiner* — Lin Ye
*Assistant Examiner* — Chriss S Yoder, III
(74) *Attorney, Agent, or Firm* — Cha & Reiter, LLC.

(57) ABSTRACT

An electronic device according to various embodiments comprises a first image sensor and a second image sensor which is electrically connected to the first image sensor by means of one designated interface. The second image sensor can be configured so as to: receive a first signal, for shifting from a first state to a second state, from the first image sensor; while the first image sensor detects light outside the
(Continued)

electronic device by means of a plurality of first pixels, detect the light by means of a plurality of second pixels on the basis of the first signal; receive a second signal, for shifting from the second state to the first state, from the first image sensor; and, while the first image sensor obtains first data corresponding to the light detected by means of the plurality of first pixels, obtain second data corresponding to the light detected by means of the plurality of second pixels on the basis of the second signal.

6 Claims, 22 Drawing Sheets

(51) Int. Cl.
*H04N 5/353* (2011.01)
*H04N 5/347* (2011.01)
*H04N 5/378* (2011.01)

(52) U.S. Cl.
CPC ............ *H04N 5/2353* (2013.01); *H04N 5/347* (2013.01); *H04N 5/378* (2013.01)

(56) References Cited

U.S. PATENT DOCUMENTS

| | | | |
|---|---|---|---|
| 10,887,534 B2 * | 1/2021 | Wojcik | H04N 5/341 |
| 2002/0057338 A1 | 5/2002 | Fujiwara et al. | |
| 2012/0113230 A1 | 5/2012 | Jin | |
| 2012/0194712 A1 * | 8/2012 | Crook | H04N 5/247 |
| | | | 348/262 |
| 2014/0085419 A1 | 3/2014 | Yoshizawa | |
| 2014/0192213 A1 | 7/2014 | Han et al. | |
| 2016/0366398 A1 | 12/2016 | Chen et al. | |
| 2017/0187928 A1 | 6/2017 | Kim et al. | |

FOREIGN PATENT DOCUMENTS

| | | | |
|---|---|---|---|
| JP | 2000-244871 A | 9/2000 |
| JP | 2000-341719 A | 12/2000 |
| JP | 2007-066274 A | 3/2007 |
| JP | 2012-253599 A | 12/2012 |
| KR | 10-2012-0047595 A | 5/2012 |
| KR | 10-2017-0076398 A | 7/2017 |

\* cited by examiner

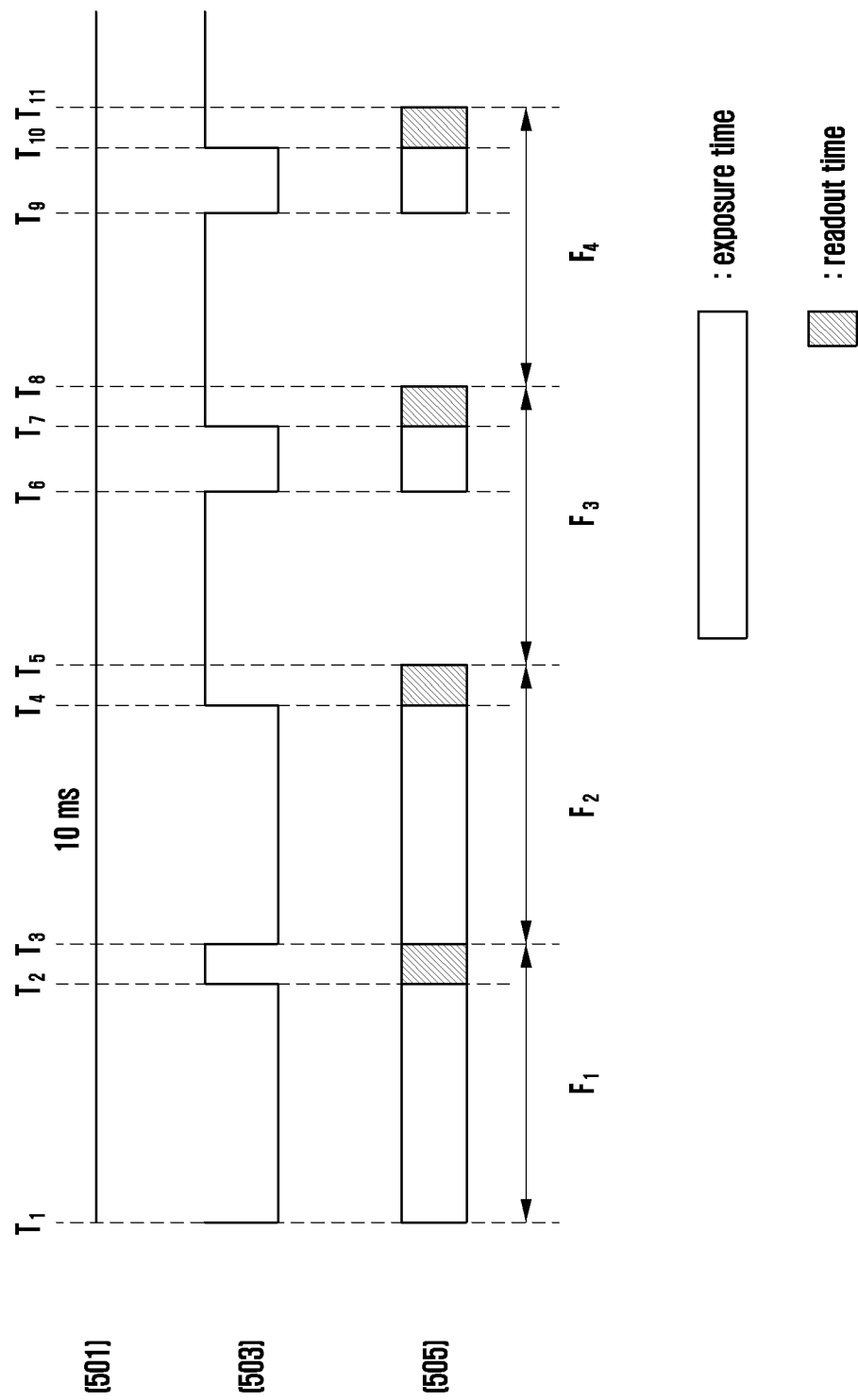

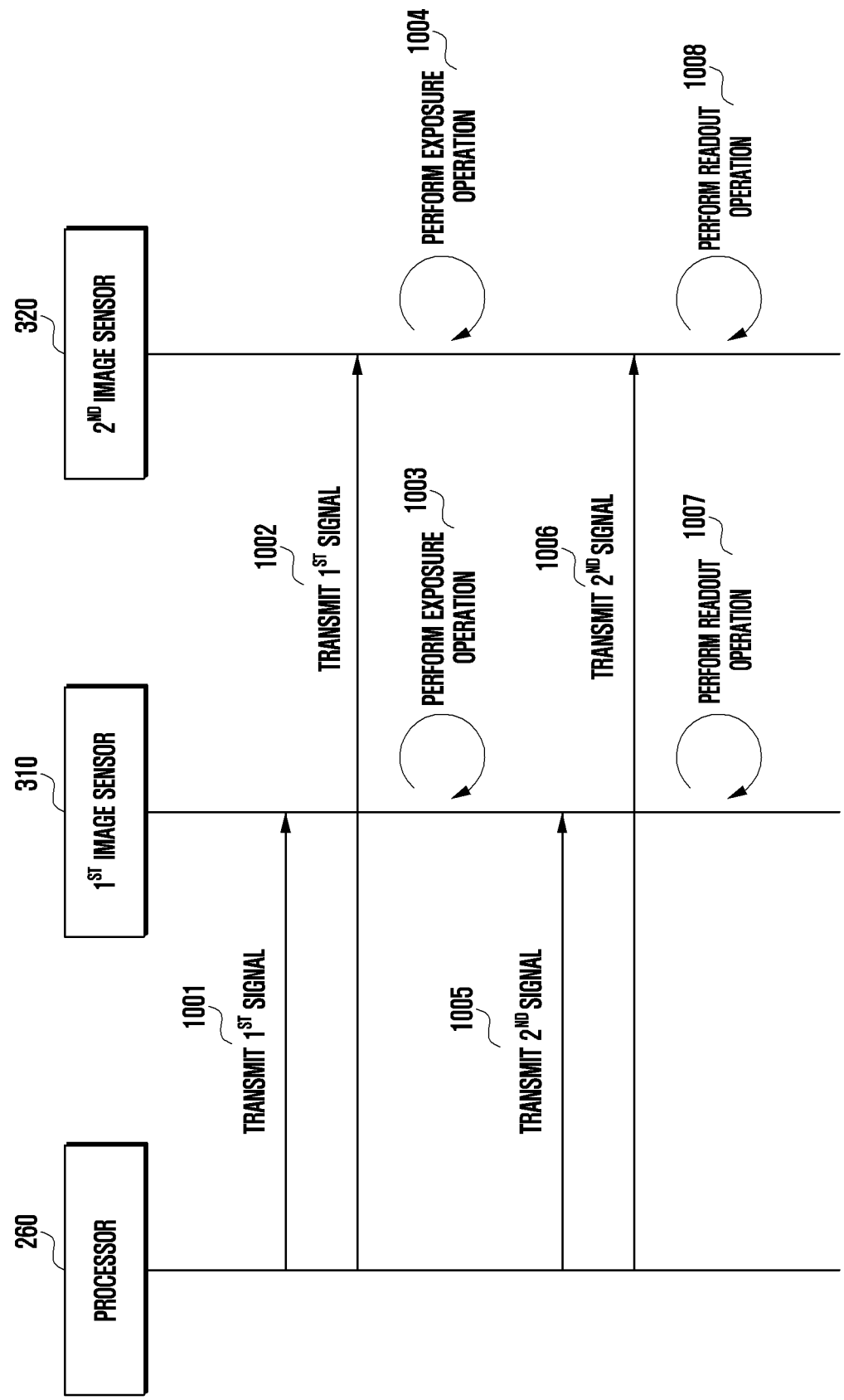

ELECTRONIC DEVICE AND METHOD FOR OBTAINING DATA FROM SECOND IMAGE SENSOR BY MEANS OF SIGNAL PROVIDED FROM FIRST IMAGE SENSOR

CROSS REFERENCE TO RELATED APPLICATIONS

This application is a National Phase Entry of PCT International Application No. PCT/2018/008510, which was filed on Jul. 27, 2018, and claims a priority to Korean Patent Application No. 10-2017-0118921, which was filed on Sep. 15, 2017, the contents of which are incorporated herein by reference.

TECHNICAL FIELD

Various embodiments of the disclosure relate to a method and electronic device for acquiring data at a second image sensor by using a signal provided by a first image sensor.

BACKGROUND ART

With the recent growths of related technologies, electronic devices such as a smart phone, a tablet PC, and the like that support various user functions have been released. Such an electronic device may include a camera and provide various camera-related functions to a user. Further, in these days, an electronic device including two or more image sensors have also been introduced.

DISCLOSURE OF INVENTION

Technical Problem

The electronic device including two or more image sensors may calculate a depth of field indicating a range of a focused space by using two or more images acquired through the image sensors, or may process such images for various purposes such as synthesizing images or applying various effects to images.

Meanwhile, when settings (e.g., an exposure time) for two or more image sensors included in the electronic device are changed, time points at which commands related to the setting change are transmitted to the two or more image sensors may be different from each other. This may cause a problem that synchronization between the two or more image sensors is out of order.

Solution to Problem

According to various embodiments of the disclosure, an electronic device may include a first image sensor; and a second image sensor electrically connected to the first image sensor through a designated interface, wherein the second image sensor is configured to receive, from the first image sensor, a first signal shifting from a first state to a second state, to, while the first image sensor detects light outside the electronic device through a plurality of first pixels contained in the first image sensor, detect the light through a plurality of second pixels contained in the second image sensor, based on at least the first signal, to receive, from the first image sensor, a second signal shifting from the second state to the first state, and to, while the first image sensor acquires first data corresponding to the light detected through the plurality of first pixels, acquire second data corresponding to the light detected through the plurality of second pixels, based on at least the second signal.

According to various embodiments of the disclosure, an electronic device may include a first image sensor; and a second image sensor electrically connected to the first image sensor through a designated first interface and a designated second interface, wherein the second image sensor is configured to receive, from the first image sensor through the first interface, a first signal shifting from a first state to a second state, to, while the first image sensor detects light outside the electronic device through a plurality of first pixels contained in the first image sensor, detect the light through a plurality of second pixels contained in the second image sensor, based on at least the first signal, to receive, from the first image sensor through the second interface, a second signal shifting from a third state to a fourth state, and to, while the first image sensor acquires first data corresponding to the light detected through the plurality of first pixels, acquire second data corresponding to the light detected through the plurality of second pixels, based on at least the second signal.

According to various embodiments of the disclosure, an electronic device may include a first image sensor; a second image sensor; and a processor electrically connected to the first and second image sensors through a designated interface, wherein the processor is configured to transmit, to the first and second image sensors through the designated interface, at least one of a first signal shifting from a first state to a second state and a second signal shifting from the second state to the first state, and wherein the first and second image sensors are configured to detect light outside the electronic device through a plurality of first pixels contained in the first image sensor and a plurality of second pixels contained in the second image sensor, based on at least receiving the first signal through the designated interface, and to acquire first data corresponding to the light detected through the plurality of first pixels and second data corresponding to the light detected through the plurality of second pixels, based on at least receiving the second signal through the designated interface.

Advantageous Effects of Invention

According to various embodiments of the disclosure, synchronization associated with an exposure time and a readout timing between two or more image sensors included in an electronic device may be accurately matched using a synchronization signal.

BRIEF DESCRIPTION OF DRAWINGS

FIGS. 5A to 5E are diagrams illustrating examples of an operation of an image sensor related to an exposure time and a readout timing according to various embodiments of the disclosure.

FIG. 10 is a flow diagram illustrating a method for acquiring data at first and second image sensors by using a signal provided by a processor according to various embodiments of the disclosure.

MODE FOR THE INVENTION

Figure 1:
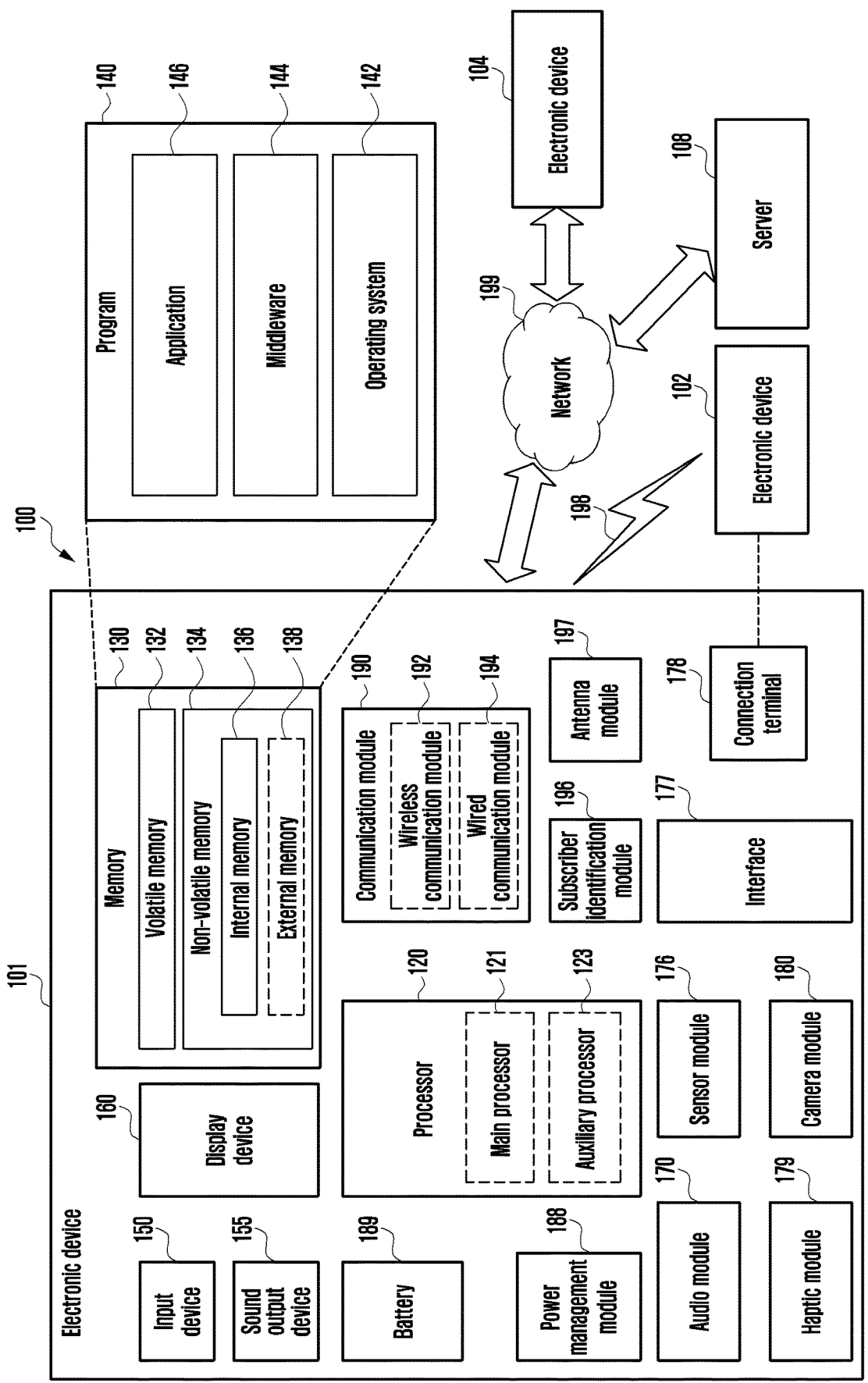
FIG. 1 is a block diagram illustrating an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation.

According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
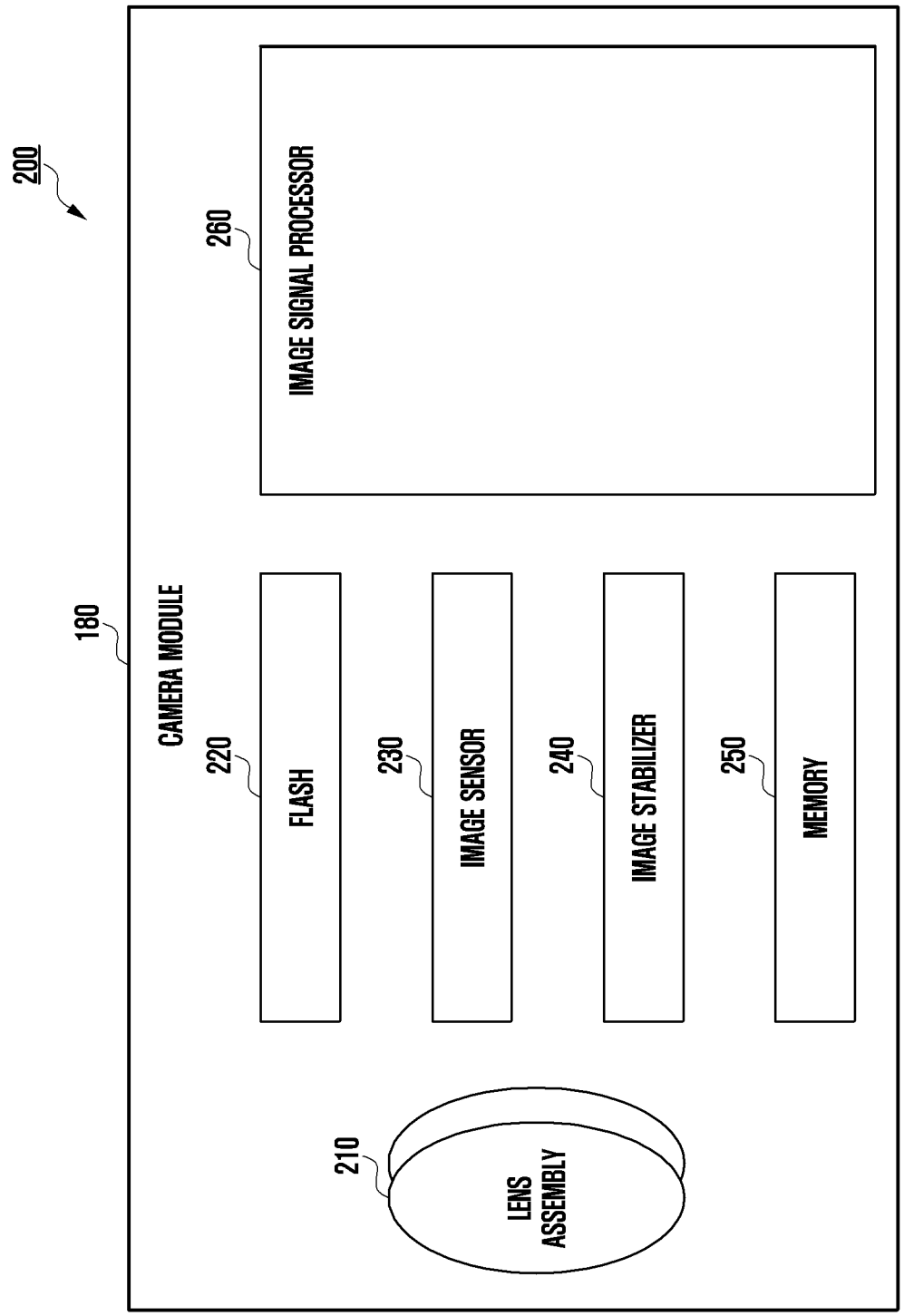
FIG. 2 is a block diagram illustrating a camera module according to various embodiments of the disclosure.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
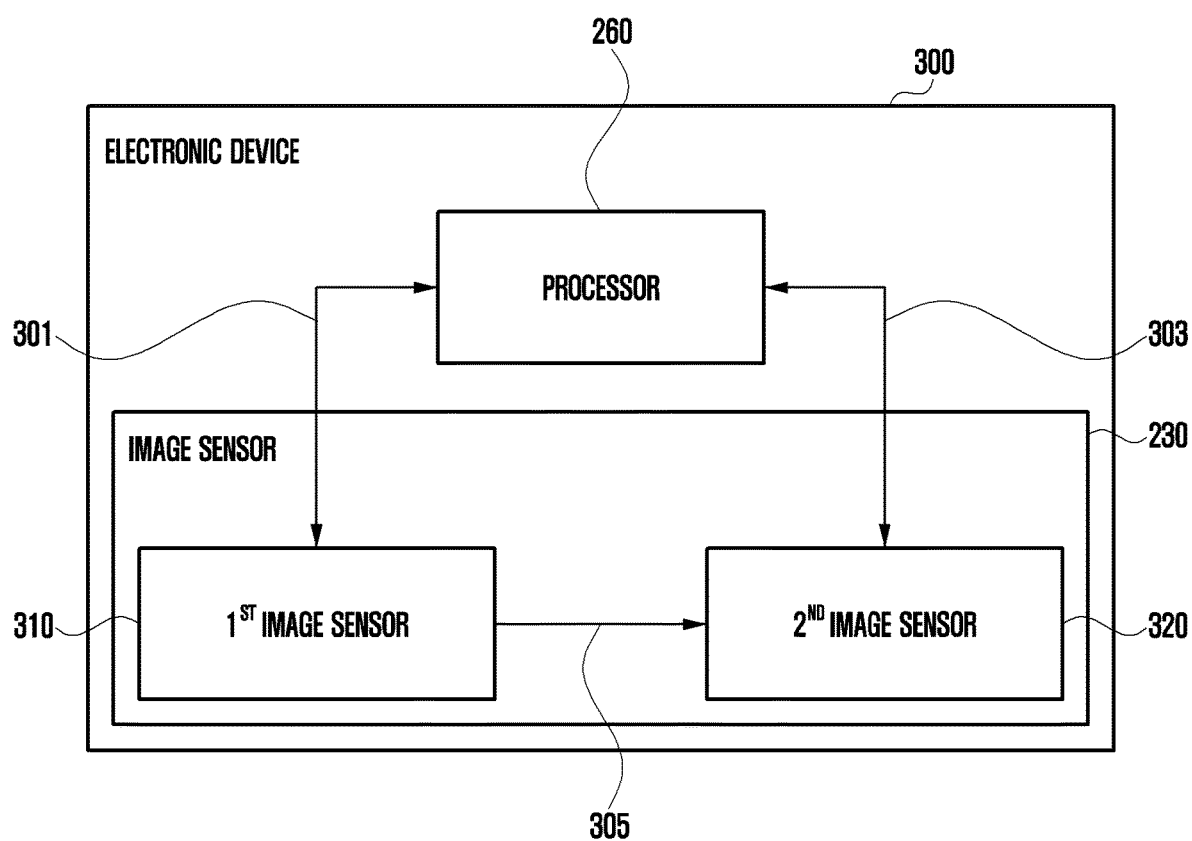
FIG. 3 is a block diagram illustrating a configuration of an electronic device according to various embodiments of the disclosure.

FIG. 3 is a block diagram illustrating a configuration of an electronic device 300 according to various embodiments of the disclosure. According to various embodiments, the electronic device 300 may include all or part of the electronic device 101 shown in FIG. 1, and may include all or part of the camera module 180 shown in FIG. 2.

According to various embodiments, the electronic device 300 may include a processor 260 and an image sensor 230. According to various embodiments, the image sensor 230 may include a first image sensor 310 and a second image sensor 320. Although it will be described in this embodiment that the electronic device 300 includes two image sensors 310 and 320, the disclosure is not limited to this exemplary embodiment. Alternatively, the electronic device may include three or more image sensors. Although it will be described in this embodiment that the first image sensor 310 and the second image sensor 320 are included in one camera module, the disclosure is not limited to this exemplary embodiment. Alternatively, the first image sensor 310 and the second image sensor 320 may be included in two camera modules, respectively.

According to various embodiments, the processor 260 may transmit a command to the first image sensor 310 and/or the second image sensor 320. For example, the processor 260 may transmit a control command to the first image sensor 310 and/or the second image sensor 320 by using, for example, $I^2C$ communication. Alternatively, various communication schemes other than the $I^2C$ communication may be used, such as serial peripheral interface (SPI) communication, serial communication interface (SCI) communication, and controller area network (CAN) communication. Meanwhile, the processor 260 may transmit a control command associated with an exposure time and/or a readout timing to one of the first and second image sensors 310 and 320. In addition, the processor 260 may transmit various commands associated with a camera control to the first image sensor 310 and/or the second image sensor 320. In this embodiment, it will be described, for example, that the processor 260 transmits a control command associated with an exposure time and/or a readout timing to the first image sensor 310.

According to various embodiments, the first image sensor 310 may receive a command from the processor 260 and perform an operation in accordance with the received command. For example, the first image sensor 310 may receive a control command from the processor 260 through an PC communication interface 301. Meanwhile, the first image sensor 310 may receive a control command associated with an exposure time and/or a readout timing from the processor 260 through, for example, the PC communication interface 301, and may perform an operation in accordance with the received control command. When receiving a control command from the processor 260 in the $n^{th}$ frame section, for example, the first image sensor 310 may apply the received control command to the $n+1^{th}$ frame or the $n+2^{th}$ frame. Here, the frame section may refer to a section from a time point of starting the $n^{th}$ readout to a time point of starting the $n+1^{th}$ readout, or a section from a time point of ending the $n^{th}$ readout to a time point of ending the $n+1^{th}$ readout. In this embodiment, it will be described, for example, that a control command received in the $n^{th}$ frame section from the processor 260 is applied to the $n+1^{th}$ frame.

The first image sensor 310 may generate a signal corresponding to exposure and readout operations in accordance with a control command associated with an exposure time and/or a readout timing. For example, when the first image sensor 310 that is set for an exposure time of 30 ms and a frame rate (i.e., frame per second) of 30 fps receives a control command for changing the exposure time to 47 ms and the frame rate to 20 fps, the first image sensor 310 may generate a signal corresponding to exposure and readout operations having the exposure time of 47 ms and a readout period of 50 ms. In another example, when the first image sensor 310 that is set for an exposure time of 30 ms and a frame rate of 30 fps receives a control command for changing the exposure time to 10 ms, the first image sensor 310 may generate a signal corresponding to exposure and readout operations having the exposure time of 10 ms and a readout period of 33 ms. The readout operation may be performed for a predetermined time. Meanwhile, according to various embodiments of the disclosure, a signal corresponding to the exposure and readout operations may be referred to as a synchronization signal.

For example, the first image sensor 310 may generate a signal having a falling edge corresponding to a time point of starting the exposure operation and a rising edge corresponding to a time point of starting the readout operation. In another example, the first image sensor 310 may generate a signal having a rising edge corresponding to a time point of starting the exposure operation and a falling edge corresponding to a time point of starting the readout operation. Here, the falling edge may mean that a signal shifts from a first state to a second state. For example, when a voltage of an interface line for signal transmission is changed from a specific voltage (e.g., 5V) to a ground voltage (e.g., 0V), it may be determined as occurrence of the falling edge. On the other hand, the rising edge may mean that a signal shifts from a second state to a first state. For example, when a voltage of an interface line for signal transmission is changed from a ground voltage (e.g., 0V) to a specific voltage (e.g., 5V), it may be determined as occurrence of the rising edge.

The first image sensor 310 may detect light outside the electronic device 300 in accordance with the generated signal corresponding to the exposure and readout operations. For example, from a time point of the falling edge in the signal corresponding to the exposure and readout operations, the first image sensor 310 may detect light delivered through a first lens (not shown) (e.g., the lens assembly 210) corresponding to the first image sensor 310 by using a plurality of light sensing elements included in the first image sensor 310. The plurality of light sensing elements may accumulate electron-hole pairs (EHPs) from the detected light, and may be referred to as pixels.

The first image sensor 310 may perform a readout in accordance with the generated signal corresponding to the exposure and readout operations. For example, from a time point of the rising edge in the signal corresponding to the exposure and readout operations, the first image sensor 310 may read out EHPs accumulated in the plurality of light sensing devices, and acquire raw data for image generation, based on the readout EHPs. In addition, the first image sensor 310 may convert the raw data acquired based on the readout EHPs into digital data, and transmit the digital data to the processor 260. For example, the first image sensor 310 may transmit the digital data to the processor 260 through MIPI.

The first image sensor 310 may transmit the generated signal corresponding to the exposure and readout operations to the second image sensor 320 through an interface 305 for synchronization between the image sensors. For example, the first image sensor 310 may transmit the signal corresponding to the exposure and readout operations to the second image sensor 320 simultaneously with generating the signal or after a predetermined time elapses from a generation time point of the signal. In addition, the first image sensor 310 may perform the respective operations in accordance with the signal corresponding to the exposure and readout operations simultaneously with transmitting the signal to the second image sensor 320 or after a predetermined time elapses from a transmission time point of the signal.

According to various embodiments, the second image sensor 320 may receive a command from the processor 260 and perform an operation in accordance with the received command. For example, the second image sensor 320 may receive a control command from the processor 260 through an PC communication interface 303. Meanwhile, when receiving a control command from the processor 260 in the $n^{th}$ frame section, for example, the second image sensor 320 may apply the received control command to the $n+1^{th}$ frame or the $n+2^{th}$ frame.

The second image sensor 320 may receive the signal corresponding to the exposure and readout operations from the first image sensor 310 through the interface 305 for synchronization between the image sensors.

For example, the second image sensor 320 may perform the exposure operation in accordance with the signal corresponding to the exposure and readout operations received from the first image sensor 310. For example, from a time point of the falling edge in the signal corresponding to the exposure and readout operations, the second image sensor 320 may detect light outside the electronic device 300 delivered through a second lens (not shown) (e.g., the lens assembly 210) corresponding to the second image sensor 320 by using a plurality of light sensing elements included in the second image sensor 320.

The second image sensor 320 may perform a readout in accordance with the signal corresponding to the exposure and readout operations received from the first image sensor 310. For example, from a time point of the rising edge in the signal corresponding to the exposure and readout operations, the second image sensor 320 may read out EHPs accumulated in the plurality of light sensing devices, and acquire raw data for image generation, based on the readout EHPs. In addition, the second image sensor 320 may convert the raw data acquired based on the readout EHPs into digital data, and transmit the digital data to the processor 260. For example, the second image sensor 320 may transmit the digital data to the processor 260 through MIPI.

Meanwhile, the second image sensor 320 may perform the respective operations in accordance with the signal corresponding to the exposure and readout operations simultaneously with receiving the signal from the first image sensor 310 or after a predetermined time elapses from a reception time point of the signal.

Figure 4A:
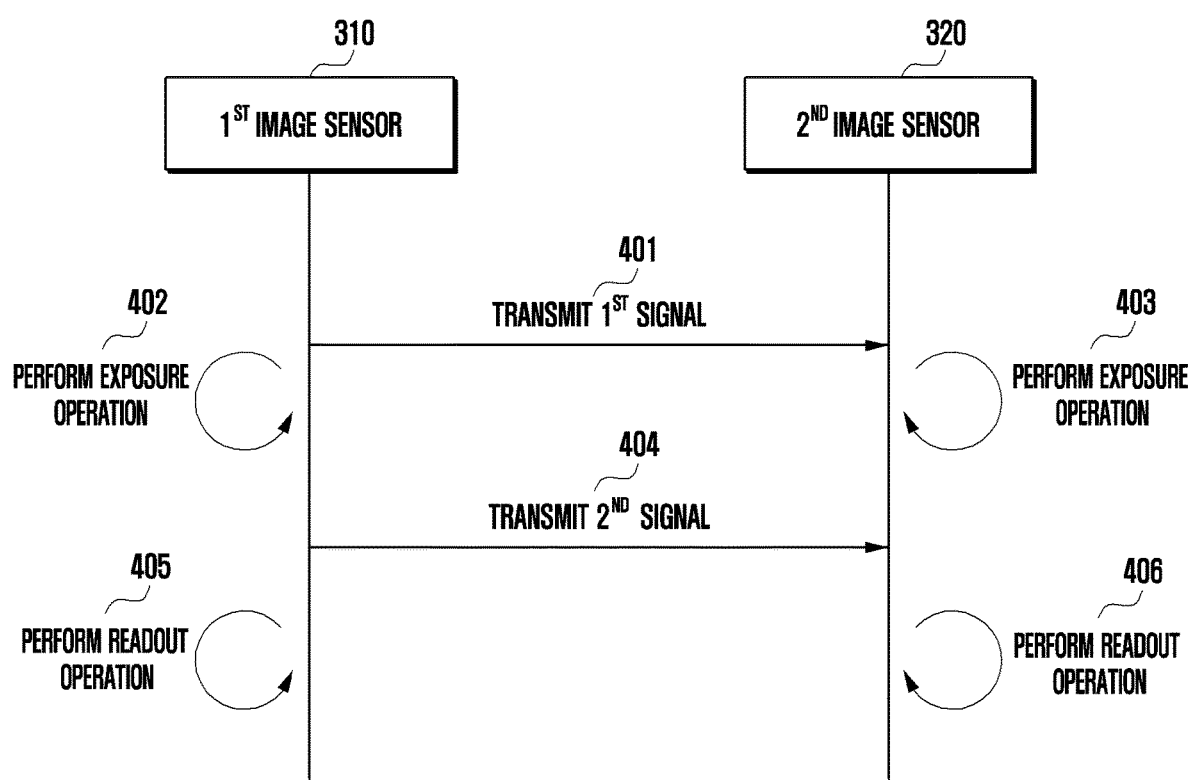
FIG. 4A is a flow diagram illustrating a method for acquiring data at a second image sensor by using a signal provided by a first image sensor according to various embodiments of the disclosure.

FIG. 4A is a flow diagram illustrating a method for acquiring data at a second image sensor 320 by using a signal provided by a first image sensor 310 of an electronic device 300 according to various embodiments of the disclosure. Descriptions duplicated with those of previously done in FIG. 3 will be omitted below.

According to various embodiments, at operation 401, the first image sensor 310 may transmit a falling edge signal contained in the signal corresponding to the exposure and readout operations to the second image sensor 320. The falling edge signal may indicate a portion where the falling edge shifting from the first state to the second state occurs in the signal corresponding to the exposure and readout operations.

According to various embodiments, at operations 402 and 403, the first image sensor 310 and the second image sensor 320 may perform the exposure operation, based on the falling edge signal indicating a shift from the first state to the second state. For example, from a time point of the falling edge in the signal corresponding to the exposure and readout operations, each of the first and second image sensors 310 and 320 may detect light outside the electronic device 300 by using a plurality of pixels included therein.

Meanwhile, for example, the first image sensor 310 may perform the respective operations in accordance with the signal corresponding to the exposure and readout operations simultaneously with transmitting the signal to the second image sensor 320, and the second image sensor 320 may perform the respective operations in accordance with the signal corresponding to the exposure and readout operations simultaneously with receiving the signal from the first image sensor 310. Therefore, while the first image sensor 310 detects light by using a plurality of pixels included therein, the second image sensor 320 may detect light by using a plurality of pixels included therein.

According to various embodiments, at operation 404, the first image sensor 310 may transmit a rising edge signal contained in the signal corresponding to the exposure and readout operations to the second image sensor 320. The rising edge signal may indicate a portion where the rising edge shifting from the second state to the first state occurs in the signal corresponding to the exposure and readout operations.

According to various embodiments, at operations 405 and 406, the first image sensor 310 and the second image sensor 320 may perform the readout operation, based on the rising edge signal indicating a shift from the second state to the first state. For example, from a time point of the rising edge in the signal corresponding to the exposure and readout operations, each of the first and second image sensors 310 and 320 may read out EHPs accumulated in the plurality of light sensing devices, and acquire raw data for image generation, based on the readout EHPs.

Meanwhile, for example, the first image sensor 310 may perform the respective operations in accordance with the signal corresponding to the exposure and readout operations simultaneously with transmitting the signal to the second image sensor 320, and the second image sensor 320 may perform the respective operations in accordance with the signal corresponding to the exposure and readout operations simultaneously with receiving the signal from the first image sensor 310. Therefore, while the first image sensor 310 acquires data corresponding to light detected through the plurality of pixels included therein, the second image sensor 320 may acquire data corresponding to light detected through the plurality of pixels included therein.

Figure 4B:
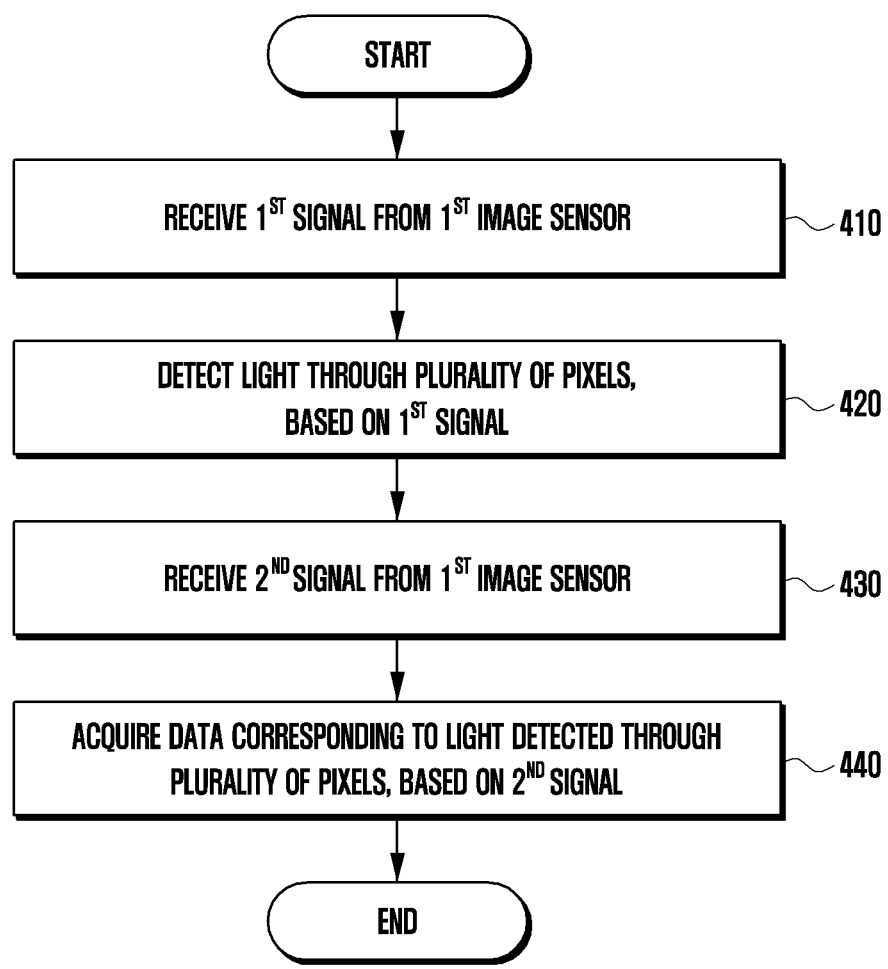
FIG. 4B is a flow diagram illustrating a method for acquiring data at a second image sensor by using a signal provided by a first image sensor according to various embodiments of the disclosure.

FIG. 4B is a flow diagram illustrating a method for acquiring data at a second image sensor by using a signal provided by a first image sensor according to various embodiments of the disclosure. Descriptions duplicated with those of previously done in FIGS. 3 and 4A will be omitted below.

According to various embodiments, at operation 410, the second image sensor 320 may receive the signal corresponding to the exposure and readout operations from the first image sensor 310, and receive the falling edge signal contained in the signal corresponding to the exposure and readout operations.

According to various embodiments, at operation 420, the second image sensor 320 may perform the exposure operation, based on the falling edge signal received from the first image sensor 310. For example, from a time point of the falling edge in the signal corresponding to the exposure and readout operations, the second image sensor 320 may detect light by using a plurality of pixels included therein.

Meanwhile, for example, the first image sensor 310 may perform the respective operations in accordance with the signal corresponding to the exposure and readout operations simultaneously with transmitting the signal to the second image sensor 320, and the second image sensor 320 may perform the respective operations in accordance with the signal corresponding to the exposure and readout operations simultaneously with receiving the signal from the first image sensor 310. Therefore, while the first image sensor 310 detects light by using a plurality of pixels included therein, the second image sensor 320 may detect light by using a plurality of pixels included therein.

According to various embodiments, at operation 430, the second image sensor 320 may receive the rising edge signal contained in the signal corresponding to the exposure and readout operations from the first image sensor 310.

According to various embodiments, at operation 440, the second image sensor 320 may acquire data corresponding to light detected through a plurality of pixels included therein, based on the rising edge signal received from the first image sensor 310. For example, from a time point of the rising edge in the signal corresponding to the exposure and readout operations, the second image sensor 320 may read out EHPs accumulated in the plurality of light sensing devices, and acquire raw data for image generation, based on the readout EHPs.

Meanwhile, for example, while the first image sensor 310 acquires data corresponding to light detected through the plurality of pixels included therein, the second image sensor 320 may acquire data corresponding to light detected through the plurality of pixels included therein.

FIGS. 5A to 5E are diagrams illustrating examples of an operation of an image sensor 310 or 320 related to an exposure time and a readout timing according to various embodiments of the disclosure.

Figure 5A:
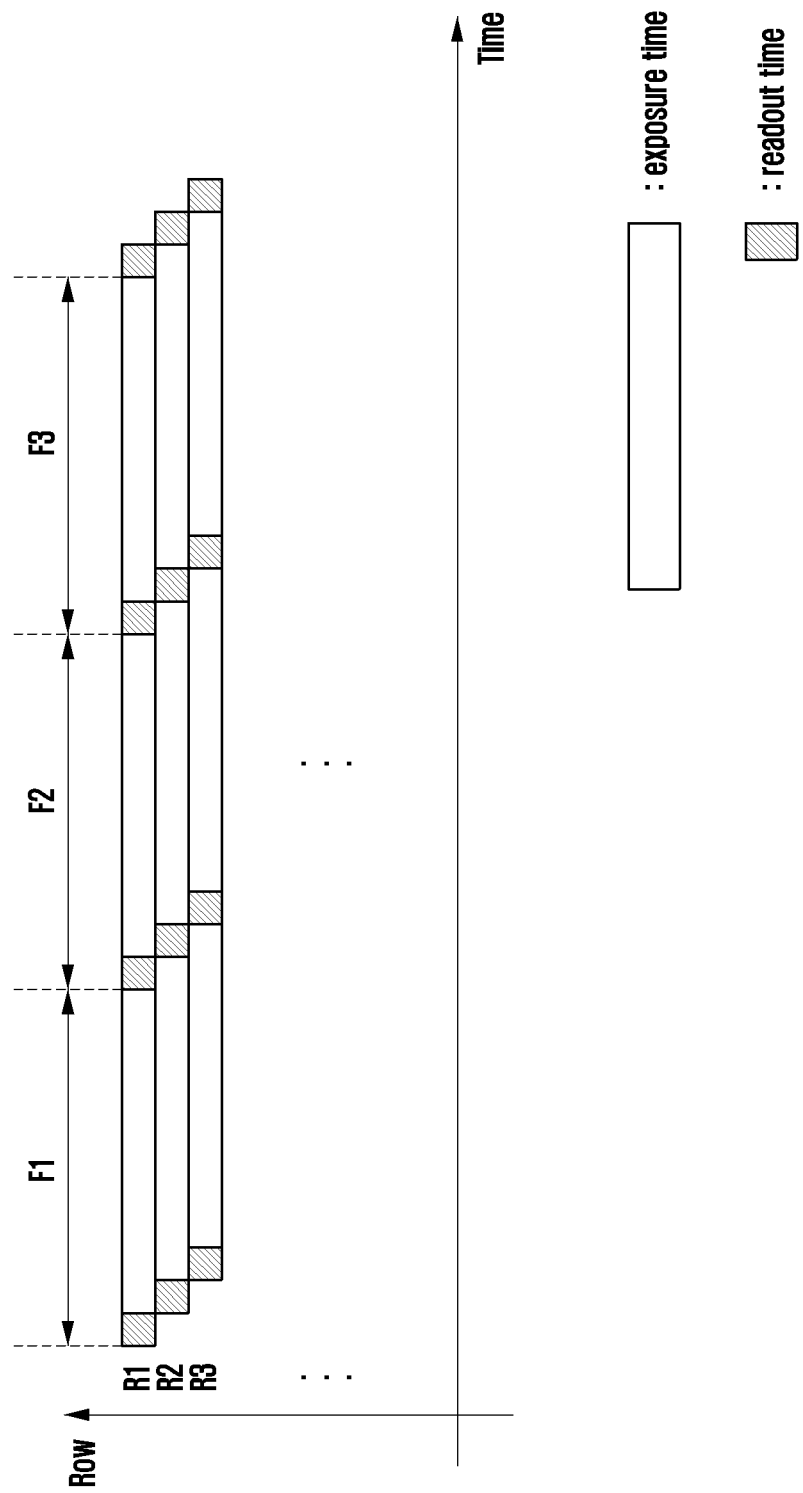

Referring to FIG. 5A, each of the first and second image sensors 310 and 320 according to various embodiments may include a plurality of row lines composed of an array of pixels, and may control the operation of the pixels in units of a row line. For example, each of the first and second image sensors 310 and 320 may sequentially select the plurality of row lines (e.g., R1, R2, and R3). For example, each of the first and second image sensors 310 and 320 may sequentially perform the exposure operation in row line units, and may sequentially perform the readout operation in row line units at a time point when the exposure time has elapsed. Meanwhile, although it is described, for example, in this embodiment that the first and second image sensors 310 and 320 use a rolling shutter scheme, the disclosure is not limited thereto. Alternatively, a global shutter scheme may be used.

In FIGS. 5B to 5E, a reference numeral 501 may indicate an example of a time point at which the processor 260 transmits a control command associated with an exposure time and/or a readout timing to the first image sensor 310.

In FIGS. 5B to 5E, a reference numeral 503 may indicate to an example of a signal corresponding to exposure and readout operations and generated by the first image sensor 310.

In FIGS. 5B to 5E, a reference numeral 505 may indicate an example of operations of the first and second image sensors 310 and 320 in accordance with the exposure time and the readout timing. In FIGS. 5B to 5E, an operation related to one row line included in each of the first and second image sensors 310 and 320 will be described as an example for convenience.

In FIGS. 5B to 5E, each of the first and second image sensors 310 and 320 may be in a state where an exposure time is set to 30 ms and a frame rate is set to 30 fps before a time point T1.

Figure 5B:
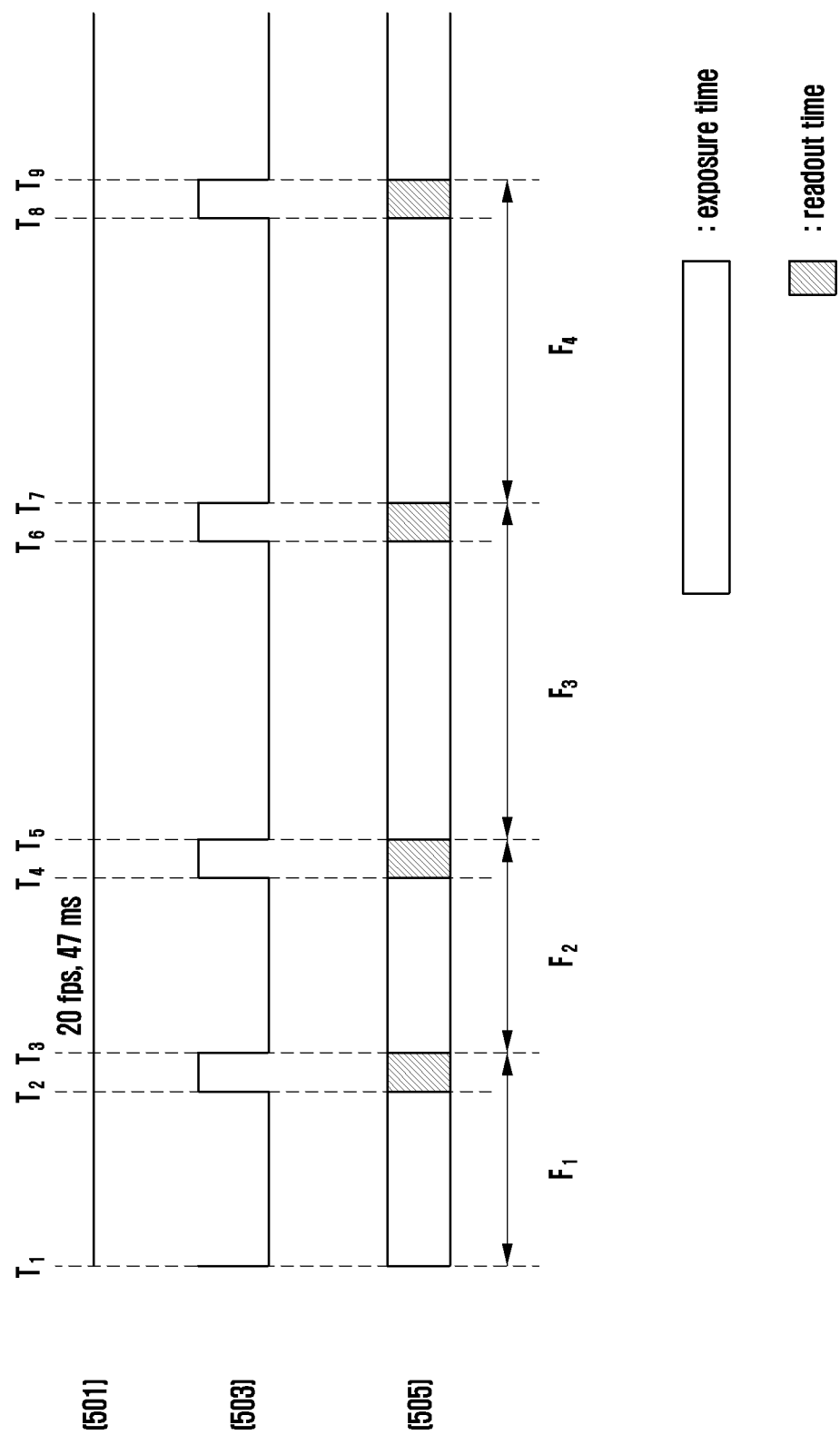

Referring to the reference numeral 503 of FIG. 5B, it can be seen that a falling edge occurs at the time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 503 of FIG. 5B, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 501 of FIG. 5B, it can be seen that the first image sensor 310 receives, from the processor 260, a control command for changing the exposure time to 47 ms and the frame rate to 20 fps between the time point T3 and a time point T5, that is, in a second frame section F2. In this case, the first image sensor 310 may generate a signal corresponding to the exposure and readout operations having an exposure time of 47 ms and a readout period of 50 ms in accordance with the control command received from the processor 260.

Referring to the reference numerals 503 and 505 of FIG. 5B, it can be seen that a falling edge occurs at the time point T5 in the signal corresponding to the exposure and readout operations, and a rising edge occurs at a time point T6 after the changed exposure time 47 ms has elapsed from the time point T5. In addition, the first and second image sensors 310 and 320 may detect light outside the electronic device 300, based on the falling edge and the rising edge, and read out EHPs accumulated in the plurality of light sensing elements.

Referring to the reference numeral 503 of FIG. 5C, it can be seen that a falling edge occurs at a time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 503 of FIG. 5C, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 501 of FIG. 5C, it can be seen that the first image sensor 310 receives, from the processor 260, a control command for changing the exposure time to 10 ms between the time point T3 and a time point T4, that is, in a second frame section F2. In this case, in accordance with the control command received from the processor 260, the first image sensor 310 may generate a signal corresponding to the exposure and readout operations having an exposure time of 10 ms and the same readout period of 33 ms as that in the first frame section F1.

Referring to the reference numeral 503 of FIG. 5C, unlike the reference numeral 503 of FIG. 5B, it can be seen that a falling edge occurs at a time point T6 rather than at a time point T5 in the signal corresponding to the exposure and readout operations. In addition, it can be seen that a rising edge occurs at a time point T7 after the changed exposure time 10 ms has elapsed from the time point T6 in the signal corresponding to the exposure and readout operations.

Referring to the reference numeral 505 of FIG. 5C, the first and second image sensors 310 and 320 may detect light outside the electronic device 300, based on the falling edge at the time point T6, and read out the EHPs accumulated in each of the plurality of light sensing elements, based on the rising edge at the time point T7.

Meanwhile, it can be seen that all of the first frame section F1 to the fourth frame section F4 are as 33 ms corresponding to 30 fps which is the frame rate previously set before the time point T1.

Figure 5D:
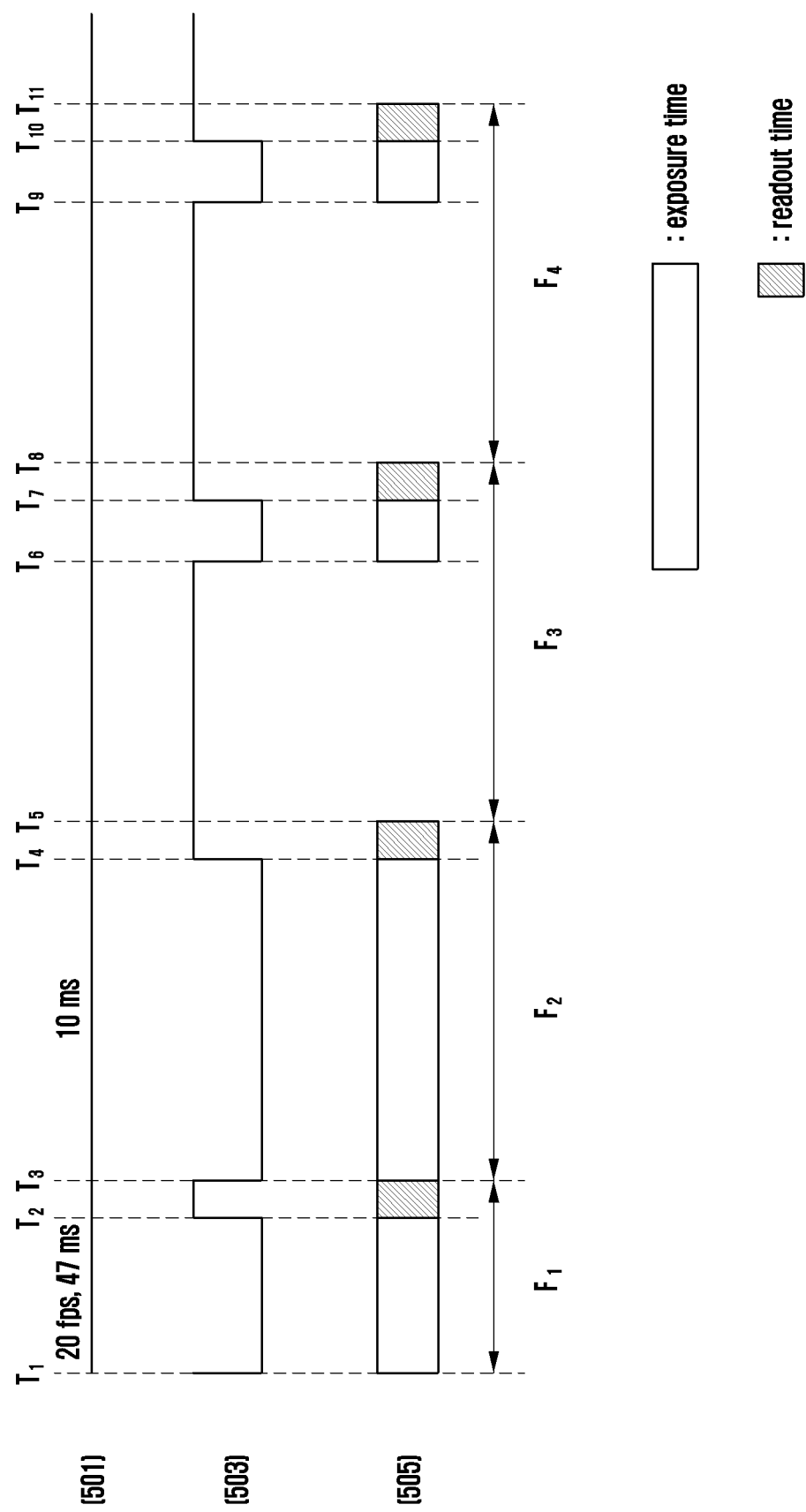

Referring to the reference numeral 503 of FIG. 5D, it can be seen that a falling edge occurs at a time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 503 of FIG. 5D, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 501 of FIG. 5D, it can be seen that the first image sensor 310 receives, from the processor 260, a control command for changing the exposure time to 47 ms and the frame rate to 20 fps between the time point T1 and the time point T3, that is, in the first frame section F1. In this case, the first image sensor 310 may generate a signal corresponding to the exposure and readout operations having an exposure time of 47 ms and a readout period of 50 ms in accordance with the control command received from the processor 260.

Referring to the reference numeral 503 of FIG. 5D, it can be seen that a falling edge occurs at the time point T3 in the signal corresponding to the exposure and readout operations. Also, it can be seen that a rising edge occurs at a time point T4 after the changed exposure time 47 ms has elapsed from the time point T3 in the signal corresponding to the exposure and readout operations.

Referring to the reference numeral 505 of FIG. 5D, the first and second image sensors 310 and 320 may detect light outside the electronic device 300, based on the falling edge at the time point T3, and read out the EHPs accumulated in each of the plurality of light sensing elements, based on the rising edge at the time point T4.

Meanwhile, referring to the reference numeral 501 of FIG. 5D, it can be seen that the first image sensor 310 receives, from the processor 260, a control command for changing the exposure time to 10 ms between the time point T3 and a time point T5, that is, in a second frame section F2. In this case, in accordance with the control command received from the processor 260, the first image sensor 310 may generate a signal corresponding to the exposure and readout operations having an exposure time of 10 ms and the same readout period of 50 ms as that in the second frame section F2.

Referring to the reference numeral 503 of FIG. 5D, it can be seen that a falling edge occurs at a time point T6 rather than at the time point T5 in the signal corresponding to the exposure and readout operations. In addition, it can be seen that a rising edge occurs at a time point T7 after the changed exposure time 10 ms has elapsed from the time point T6 in the signal corresponding to the exposure and readout operations.

Referring to the reference numeral 505 of FIG. 5D, the first and second image sensors 310 and 320 may detect light outside the electronic device 300, based on the falling edge at the time point T6, and read out the EHPs accumulated in each of the plurality of light sensing elements, based on the rising edge at the time point T7.

Figure 5E:
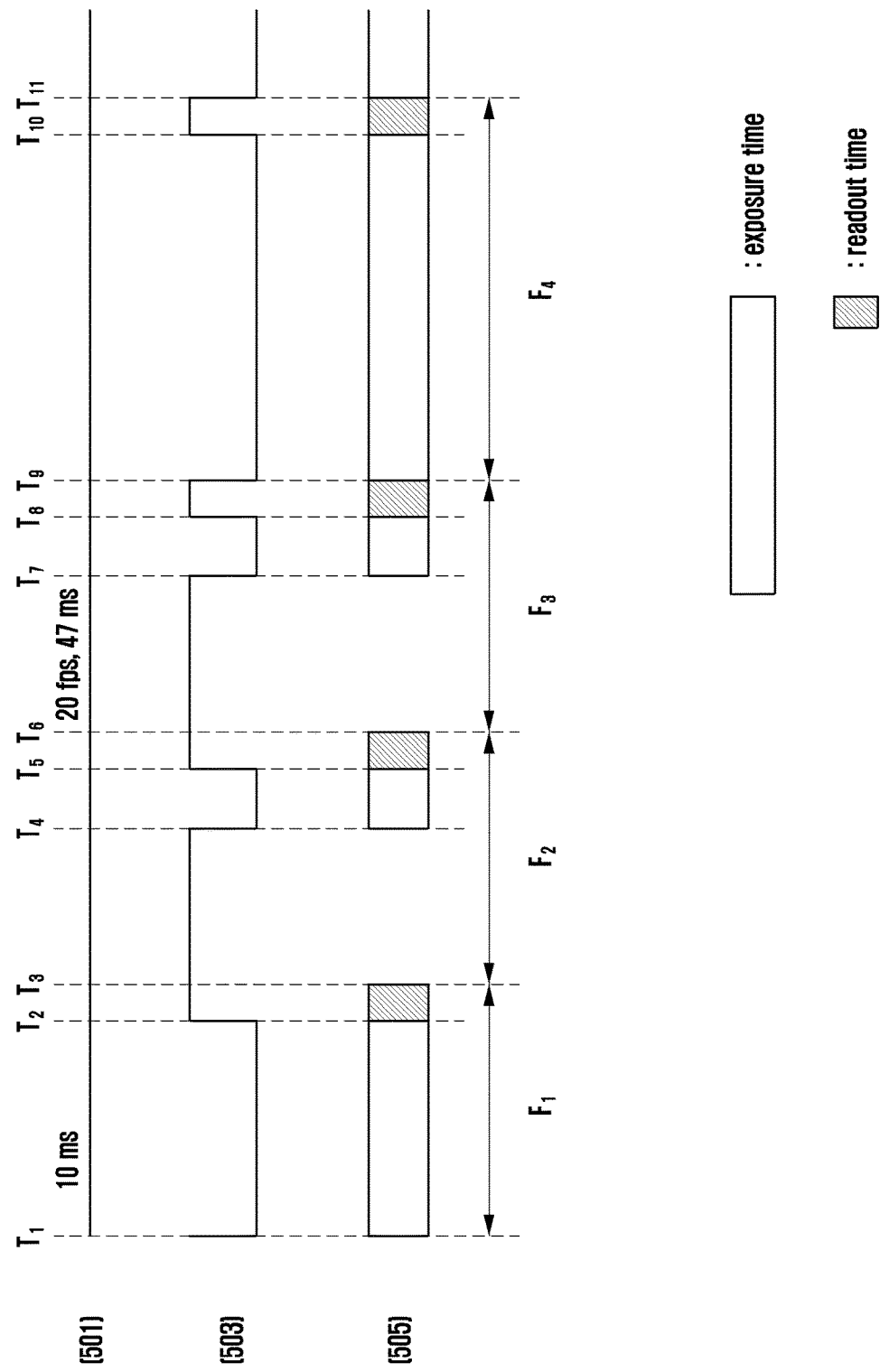

Referring to the reference numeral 503 of FIG. 5E, it can be seen that a falling edge occurs at a time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 503 of FIG. 5E, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 501 of FIG. 5E, it can be seen that the first image sensor 310 receives, from the processor 260, a control command for changing the exposure time to 10 ms between the time point T1 and the time point T3, that is, in the first frame section F1. In this case, in accordance with the control command received from the processor 260, the first image sensor 310 may generate a signal corresponding to the exposure and readout operations having an exposure time of 10 ms and the same readout period of 33 ms as that in the previous frame section.

Referring to the reference numeral 503 of FIG. 5E, it can be seen that a falling edge occurs at a time point T4 rather than at the time point T3 in the signal corresponding to the exposure and readout operations. In addition, it can be seen that a rising edge occurs at a time point T5 after the changed exposure time 10 ms has elapsed from the time point T4 in the signal corresponding to the exposure and readout operations.

Referring to the reference numeral 505 of FIG. 5E, the first and second image sensors 310 and 320 may detect light outside the electronic device 300, based on the falling edge at the time point T4, and read out the EHPs accumulated in each of the plurality of light sensing elements, based on the rising edge at the time point T5.

Meanwhile, referring to the reference numeral 501 of FIG. 5E, it can be seen that the first image sensor 310 receives, from the processor 260, a control command for changing the exposure time to 47 ms and the frame rate to 20 fps between a time point T6 and a time point T9, that is, in a third frame section F3. In this case, the first image sensor 310 may generate a signal corresponding to the exposure and readout operations having an exposure time of 47 ms and a readout period of 50 ms in accordance with the control command received from the processor 260.

Referring to the reference numeral 503 of FIG. 5E, it can be seen that a falling edge occurs at the time point T9 in the signal corresponding to the exposure and readout operations. Also, it can be seen that a rising edge occurs at a time point T10 after the changed exposure time 47 ms has elapsed from the time point T9 in the signal corresponding to the exposure and readout operations.

Referring to the reference numeral 505 of FIG. 5E, the first and second image sensors 310 and 320 may detect light outside the electronic device 300, based on the falling edge at the time point T9, and read out the EHPs accumulated in each of the plurality of light sensing elements, based on the rising edge at the time point T10.

Meanwhile, although not shown in FIGS. 5A to 5E, the readout time may include a blank time. For example, during the blank time, the first and second image sensors 310 and 320 may initialize the state of the plurality of light sensing elements to a state before detecting light.

Figure 6:
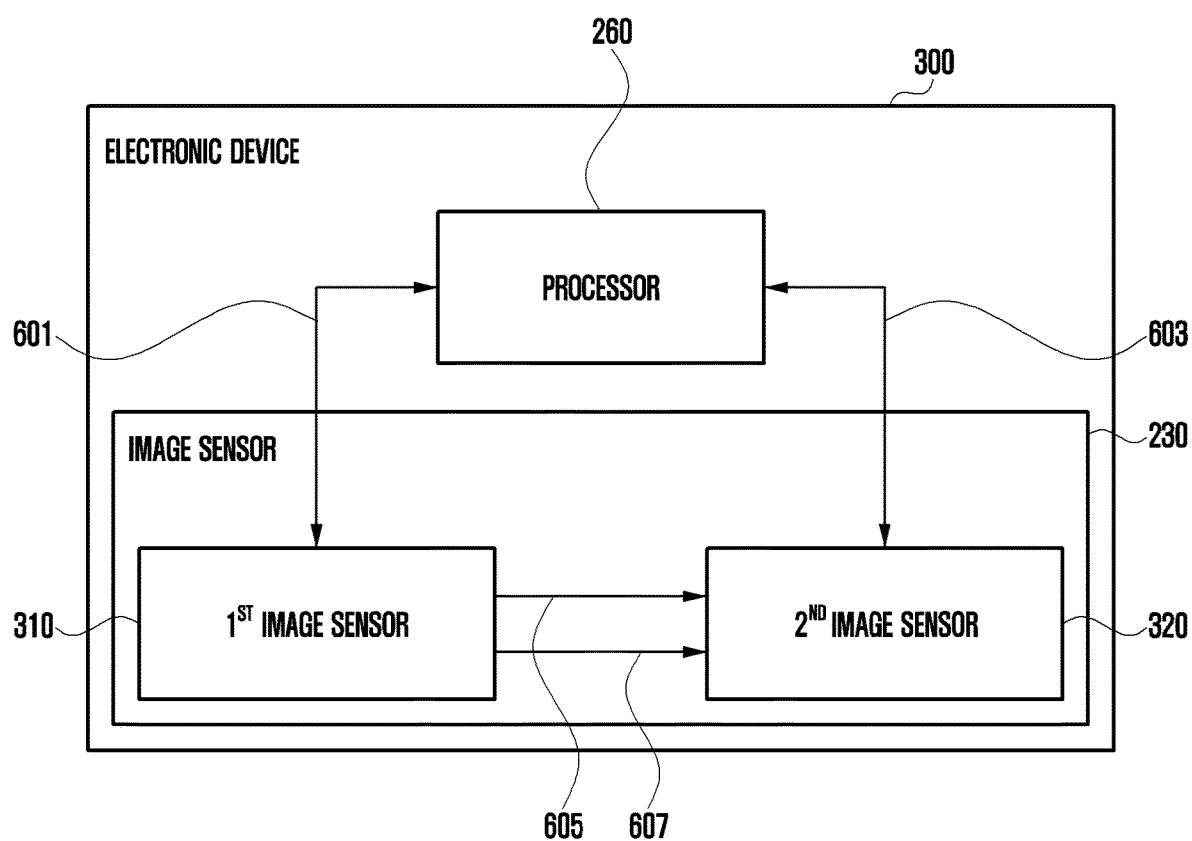
FIG. 6 is a block diagram illustrating a configuration of an electronic device according to various embodiments of the disclosure.

FIG. 6 is a block diagram illustrating a configuration of an electronic device 300 according to various embodiments of the disclosure. Descriptions duplicated with those of previously done in FIG. 3 will be omitted below.

According to various embodiments, the electronic device 300 may include a processor 260 and an image sensor 230. According to various embodiments, the image sensor 230 may include a first image sensor 310 and a second image sensor 320.

According to various embodiments, the processor 260 may transmit a command to the first image sensor 310 and/or the second image sensor 320. For example, the processor 260 may transmit a control command to the first image sensor 310 and/or the second image sensor 320 by using, for example, I²C communication. Meanwhile, the processor 260 may transmit a control command associated with an exposure time and/or a readout timing to one of the first and second image sensors 310 and 320. In this embodiment, it will be described, for example, that the processor 260 transmits a control command associated with an exposure time and/or a readout timing to the first image sensor 310.

According to various embodiments, the first image sensor 310 may receive a command from the processor 260 and perform an operation in accordance with the received command. For example, the first image sensor 310 may receive a control command from the processor 260 through an PC communication interface 601. Meanwhile, the first image sensor 310 may receive a control command associated with an exposure time and/or a readout timing from the processor 260 through, for example, the PC communication interface 601, and may perform an operation in accordance with the received control command. When receiving a control command from the processor 260 in the $n^{th}$ frame section, for example, the first image sensor 310 may apply the received control command to the $n+1^{th}$ frame or the $n+2^{th}$ frame.

The first image sensor 310 may generate an exposure synchronization signal corresponding to an exposure operation and a readout synchronization signal corresponding to a readout operation in accordance with a control command associated with an exposure time and/or a readout timing. For example, the first image sensor 310 may generate the exposure synchronization signal having a rising edge corresponding to a time point of starting the exposure operation. For example, the first image sensor 310 may generate the readout synchronization signal having a rising edge corresponding to a time point of starting the readout operation.

The first image sensor 310 may detect light outside the electronic device 300 in accordance with the generated exposure synchronization signal. For example, from a time point of the rising edge in the exposure synchronization signal, the first image sensor 310 may detect light delivered through a first lens (not shown) (e.g., the lens assembly 210) corresponding to the first image sensor 310 by using a plurality of light sensing elements included in the first image sensor 310.

The first image sensor 310 may perform a readout in accordance with the generated readout synchronization signal. For example, from a time point of the rising edge in the readout synchronization signal, the first image sensor 310 may read out EHPs accumulated in each of the plurality of light sensing devices, and acquire raw data for image generation, based on the readout EHPs. In addition, the first image sensor 310 may convert the raw data acquired based on the readout EHPs into digital data, and transmit the digital data to the processor 260. For example, the first image sensor 310 may transmit the digital data to the processor 260 through MIPI.

The first image sensor 310 may transmit the exposure synchronization signal and the readout synchronization signal to the second image sensor 320 separately through interfaces 605 and 607 for synchronization between the image sensors. For example, the first image sensor 310 may transmit the exposure synchronization signal to the second image sensor 320 through the first interface 605, and transmit the readout synchronization signal to the second image sensor 320 through the second interface 607.

According to various embodiments, the second image sensor 320 may receive a command from the processor 260 and perform an operation in accordance with the received command. For example, the second image sensor 320 may receive a control command from the processor 260 through an PC communication interface 603. Meanwhile, when receiving a control command from the processor 260 in the $n^{th}$ frame section, for example, the second image sensor 320 may apply the received control command to the $n+1^{th}$ frame or the $n+2^{th}$ frame.

The second image sensor 320 may receive the exposure synchronization signal and the readout synchronization signal from the first image sensor 310 separately through the interfaces 605 and 607 for synchronization between the image sensors.

For example, the second image sensor 320 may detect light outside the electronic device 300 in accordance with the exposure synchronization signal received from the first image sensor 310. For example, from a time point of the rising edge in the exposure synchronization signal, the second image sensor 320 may detect the light delivered through a second lens (not shown) (e.g., the lens assembly 210) corresponding to the second image sensor 320 by using a plurality of light sensing elements included in the second image sensor 320.

The second image sensor 320 may perform a readout in accordance with the readout synchronization signal received from the first image sensor 310. For example, from a time point of the rising edge in the readout synchronization signal, the second image sensor 320 may read out EHPs accumulated in the plurality of light sensing devices, and acquire raw data for image generation, based on the readout EHPs. In addition, the second image sensor 320 may convert the raw data acquired based on the readout EHPs into digital data, and transmit the digital data to the processor 260. For example, the second image sensor 320 may transmit the digital data to the processor 260 through MIPI.

Figure 7:
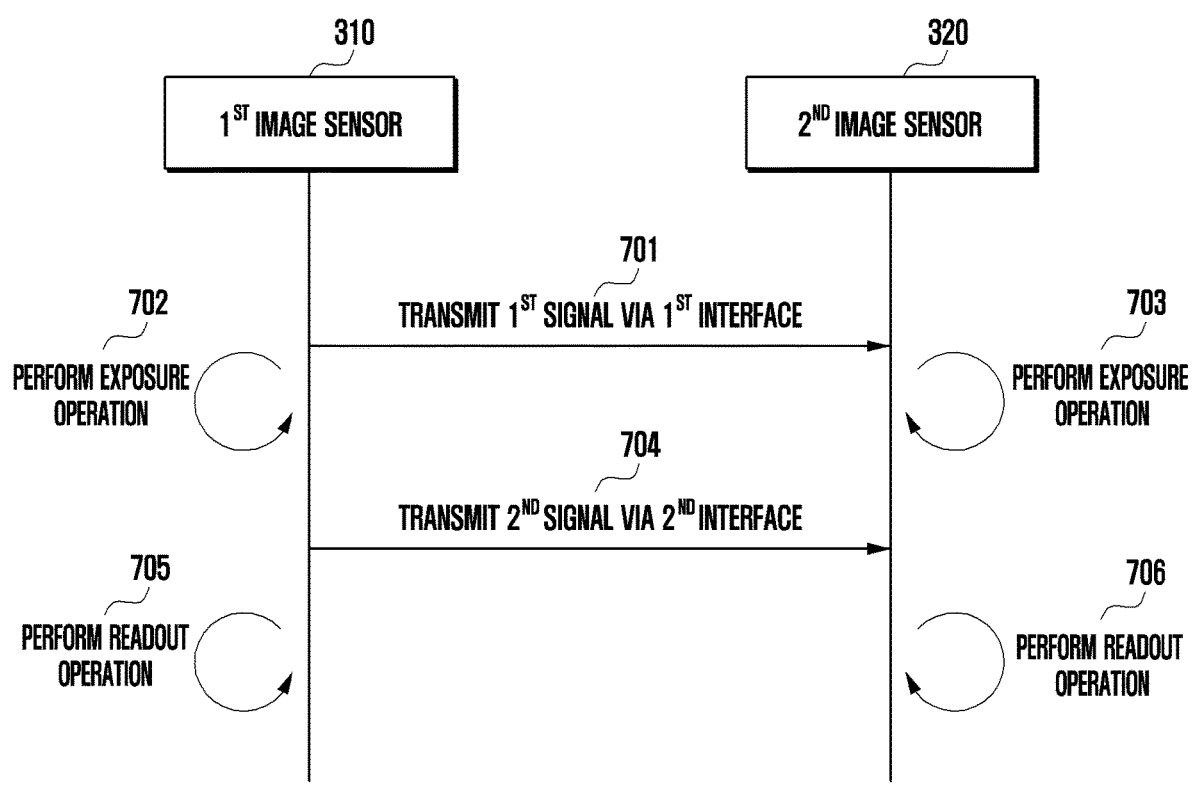
FIG. 7 is a flow diagram illustrating a method for acquiring data at a second image sensor by using a signal provided by a first image sensor according to various embodiments of the disclosure.

FIG. 7 is a flow diagram illustrating a method for acquiring data at a second image sensor 320 by using a signal provided by a first image sensor 310 of an electronic device 300 according to various embodiments of the disclosure. Descriptions duplicated with those of previously done in FIG. 3 will be omitted below.

According to various embodiments, at operation 701, the first image sensor 310 may transmit an exposure synchronization signal having a rising edge corresponding to a time point of starting an exposure operation to the second image sensor 320 through the first interface 605.

According to various embodiments, at operations 702 and 703, the first image sensor 310 and the second image sensor 320 may perform the exposure operation, based on the exposure synchronization. For example, from a time point of the rising edge in the exposure synchronization signal, each of the first and second image sensors 310 and 320 may detect light outside the electronic device 300 by using a plurality of pixels included therein.

Meanwhile, for example, the first image sensor 310 may perform the exposure operation in accordance with the exposure synchronization signal simultaneously with transmitting the exposure synchronization signal to the second image sensor 320, and the second image sensor 320 may perform the exposure operation in accordance with the exposure synchronization signal simultaneously with receiving the exposure synchronization signal from the first image sensor 310. Therefore, while the first image sensor 310 detects light by using a plurality of pixels included therein, the second image sensor 320 may detect light by using a plurality of pixels included therein.

According to various embodiments, at operation 704, the first image sensor 310 may transmit a readout synchronization signal having a rising edge corresponding to a time point of starting a readout operation to the second image sensor 320 through the first interface 605.

According to various embodiments, at operations 705 and 706, the first image sensor 310 and the second image sensor 320 may perform the readout operation, based on the readout synchronization signal. For example, from a time point of the rising edge in the readout synchronization signal, each of the first and second image sensors 310 and 320 may read out EHPs accumulated in the plurality of light sensing devices, and acquire raw data for image generation, based on the readout EHPs.

Meanwhile, for example, the first image sensor 310 may perform the readout operation in accordance with the readout synchronization signal simultaneously with transmitting the readout synchronization signal to the second image sensor 320, and the second image sensor 320 may perform the readout operation in accordance with the readout synchronization signal simultaneously with receiving the readout synchronization signal from the first image sensor 310. Therefore, while the first image sensor 310 acquires data corresponding to light detected through the plurality of pixels included therein, the second image sensor 320 may acquire data corresponding to light detected through the plurality of pixels included therein.

FIGS. 8A to 8D are diagrams illustrating examples of an operation of an image sensor 310 or 320 related to an exposure time and a readout timing according to various embodiments of the disclosure.

In FIGS. 8A to 8D, a reference numeral 801 may indicate an example of a time point at which the processor 260 transmits a control command associated with an exposure time and/or a readout timing to the first image sensor 310.

In FIGS. 8A to 8D, a reference numeral 803 may indicate to an example of an exposure synchronization signal generated by the first image sensor 310.

In FIGS. 8A to 8D, a reference numeral 805 may indicate an example of a readout synchronization signal generated by the first image sensor 310.

In FIGS. 8A to 8D, a reference numeral 807 may indicate an example of operations of the first and second image sensors 310 and 320 in accordance with the exposure time and the readout timing. Meanwhile, each of the first and second image sensors 310 and 320 according to various embodiments may include a plurality of row lines composed of an array of pixels, and may control the operation of the pixels in units of a row line. In FIGS. 8A to 8D, an operation related to one row line will be described as an example for convenience.

In FIGS. 8A to 8D, each of the first and second image sensors 310 and 320 may be in a state where an exposure time is set to 30 ms and a frame rate is set to 30 fps before a time point T1.

Figure 8A:
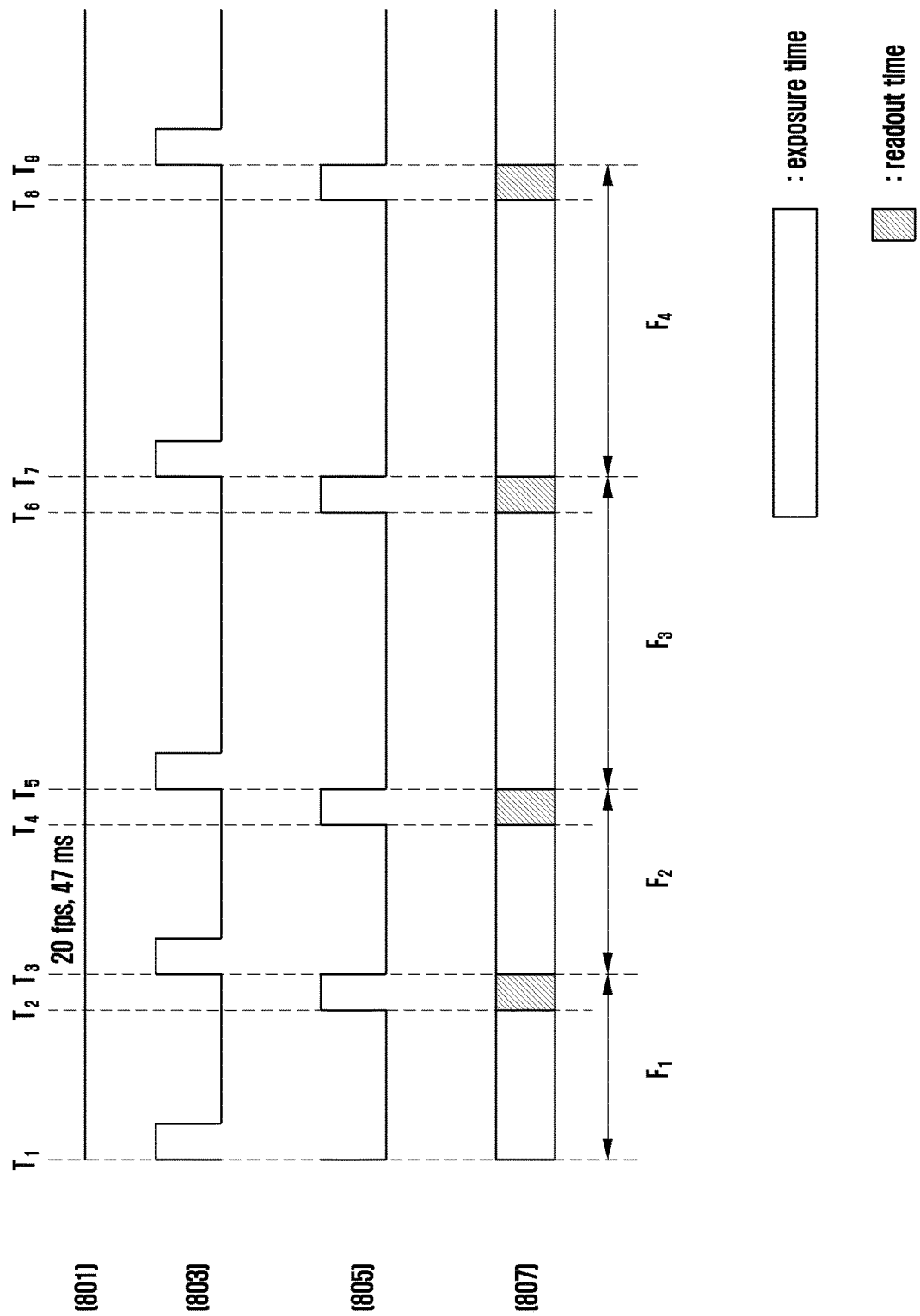
FIGS. 8A to 8D are diagrams illustrating examples of an operation of an image sensor related to an exposure time and a readout timing according to various embodiments of the disclosure.

Referring to the reference numeral 803 of FIG. 8A, it can be seen that a rising edge occurs at the time point T1 in the exposure synchronization signal. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 805 of FIG. 8A, it can be seen that a rising edge occurs at a time point T2, which is a time point when the exposure time 30 ms has elapsed from the time point T1, in the readout synchronization signal. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 801 of FIG. 8A, it can be seen that the first image sensor 310 receives, from the processor 260, a control command for changing the exposure time to 47 ms and the frame rate to 20 fps between the time point T3 and a time point T5, that is, in a second frame section F2. In this case, the first image sensor 310 may generate a readout synchronization signal having an exposure time of 47 ms and a readout period of 50 ms in accordance with the control command received from the processor 260.

Referring to the reference numerals 803 and 805 of FIG. 8A, it can be seen that a rising edge occurs at the time point T5 in the exposure synchronization signal, and a rising edge occurs at a time point T6 after the changed exposure time 47 ms has elapsed from the time point T5.

Referring to the reference numeral 807 of FIG. 8A, the first and second image sensors 310 and 320 may detect light outside the electronic device 300 and read out EHPs accumulated in the plurality of light sensing elements, based on the exposure synchronization signal and the readout synchronization signal.

Figure 8B:
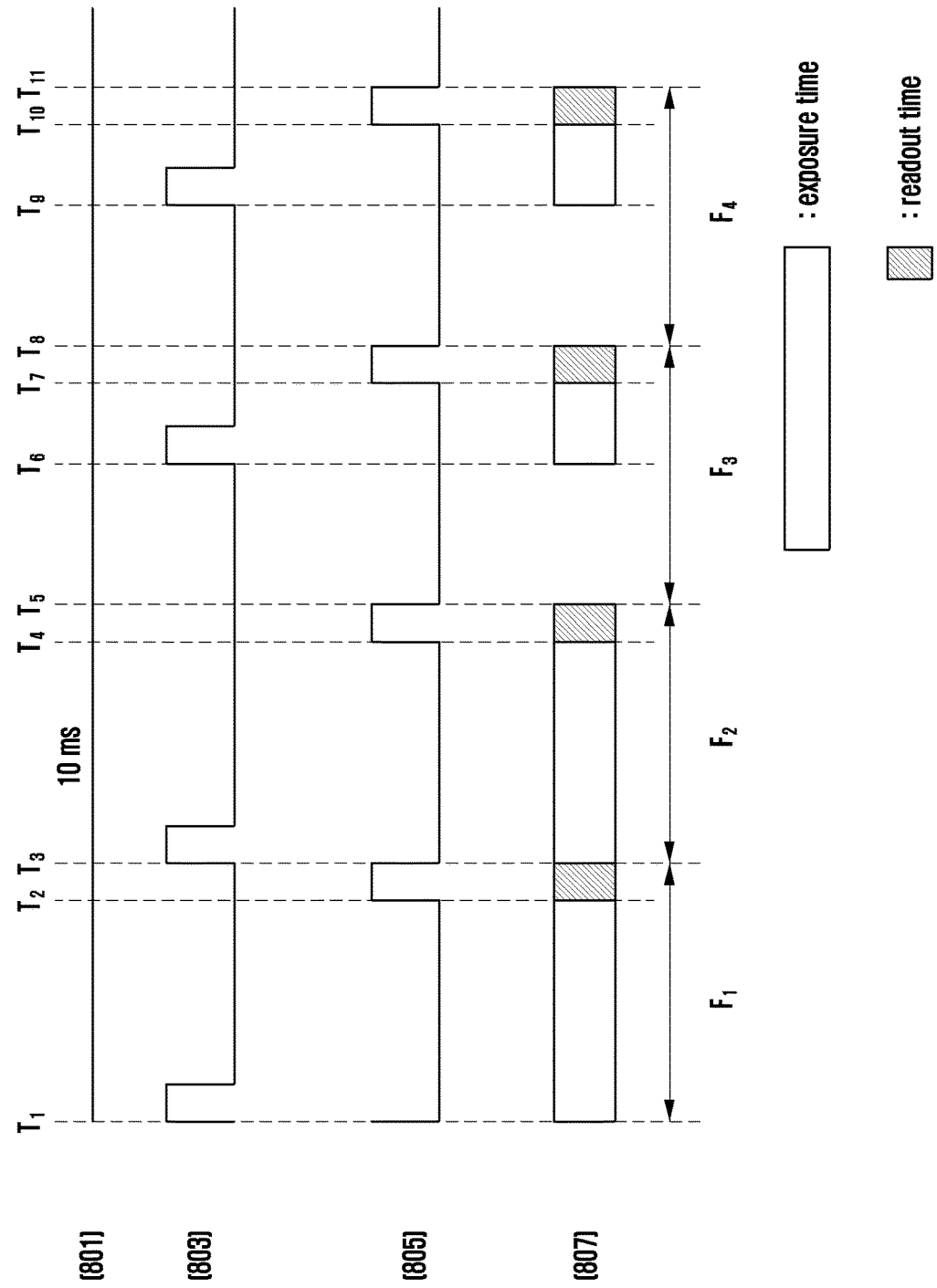

Referring to the reference numeral 803 of FIG. 8B, it can be seen that a rising edge occurs at a time point T1 in the exposure synchronization signal. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 805 of FIG. 8B, it can be seen that a rising edge occurs at a time point T2, which is a time point when the exposure time 30 ms has elapsed from the time point T1, in the readout synchronization signal. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 801 of FIG. 8B, it can be seen that the first image sensor 310 receives, from the processor 260, a control command for changing the exposure time to 10 ms between the time point T3 and a time point T4, that is, in a second frame section F2. In this case, in accordance with the control command received from the processor 260, the first image sensor 310 may generate a readout synchronization signal having an exposure time of 10 ms and the same readout period of 33 ms as that in the first frame section F1.

Referring to the reference numeral 803 of FIG. 8B, unlike the reference numeral 803 of FIG. 8A, it can be seen that a rising edge occurs at a time point T6 rather than at a time point T5 in the exposure synchronization signal.

In addition, referring to the reference numeral 805 of FIG. 8B, it can be seen that a rising edge occurs at a time point T7 after the changed exposure time 10 ms has elapsed from the time point T6 in the readout synchronization signal.

Referring to the reference numeral 807 of FIG. 8B, the first and second image sensors 310 and 320 may detect light outside the electronic device 300, based on the rising edge of the exposure synchronization signal at the time point T6, and read out the EHPs accumulated in each of the plurality of light sensing elements, based on the rising edge of the readout synchronization signal at the time point T7.

Meanwhile, it can be seen that all of the first frame section F1 to the fourth frame section F4 are as 33 ms corresponding to 30 fps which is the frame rate previously set before the time point T1.

Figure 8C:
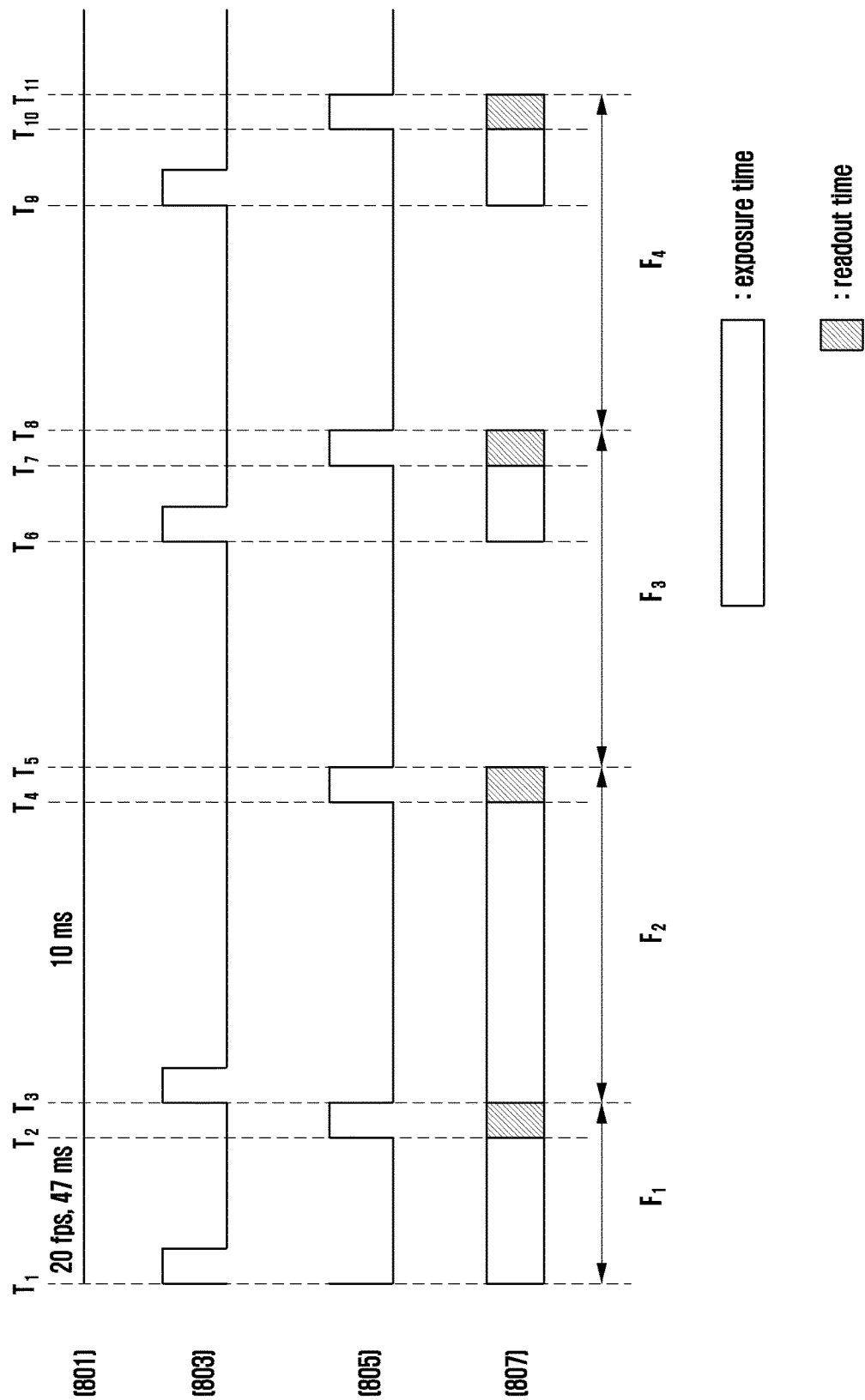

Referring to the reference numeral 803 of FIG. 8C, it can be seen that a rising edge occurs at a time point T1 in the exposure synchronization signal. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 805 of FIG. 8C, it can be seen that a rising edge occurs at a time point T2, which is a time point when the exposure time 30 ms has elapsed from the time point T1, in the readout synchronization signal. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 801 of FIG. 8C, it can be seen that the first image sensor 310 receives, from the processor 260, a control command for changing the exposure time to 47 ms and the frame rate to 20 fps between the time point T1 and the time point T3, that is, in the first frame section F1. In this case, the first image sensor 310 may generate a readout synchronization signal having an exposure time of 47 ms and a readout period of 50 ms in accordance with the control command received from the processor 260.

Referring to the reference numeral 803 of FIG. 8C, it can be seen that a rising edge occurs at a time point T3 in the exposure synchronization signal.

Also, referring to the reference numeral 805 of FIG. 8C, it can be seen that a rising edge occurs at a time point T4 after the changed exposure time 47 ms has elapsed from the time point T3 in the readout synchronization signal.

Referring to the reference numeral 807 of FIG. 8C, the first and second image sensors 310 and 320 may detect light outside the electronic device 300, based on the rising edge of the exposure synchronization signal at the time point T3, and read out the EHPs accumulated in each of the plurality of light sensing elements, based on the rising edge of the readout synchronization signal at the time point T4.

Meanwhile, referring to the reference numeral 801 of FIG. 8C, it can be seen that the first image sensor 310 receives, from the processor 260, a control command for changing the exposure time to 10 ms between the time point T3 and a time point T5, that is, in a second frame section F2. In this case, in accordance with the control command received from the processor 260, the first image sensor 310 may generate a readout synchronization signal having an exposure time of 10 ms and the same readout period of 50 ms as that in the second frame section F2.

Referring to the reference numeral 803 of FIG. 8C, it can be seen that a rising edge occurs at a time point T6 rather than at the time point T5 in the exposure synchronization signal.

In addition, referring to the reference numeral 805 of FIG. 8C, it can be seen that a rising edge occurs at a time point T7 after the changed exposure time 10 ms has elapsed from the time point T6 in the readout synchronization signal.

Referring to the reference numeral 807 of FIG. 8C, the first and second image sensors 310 and 320 may detect light outside the electronic device 300, based on the rising edge of the exposure synchronization signal at the time point T6, and read out the EHPs accumulated in each of the plurality of light sensing elements, based on the rising edge of the readout synchronization signal at the time point T7.

Figure 8D:
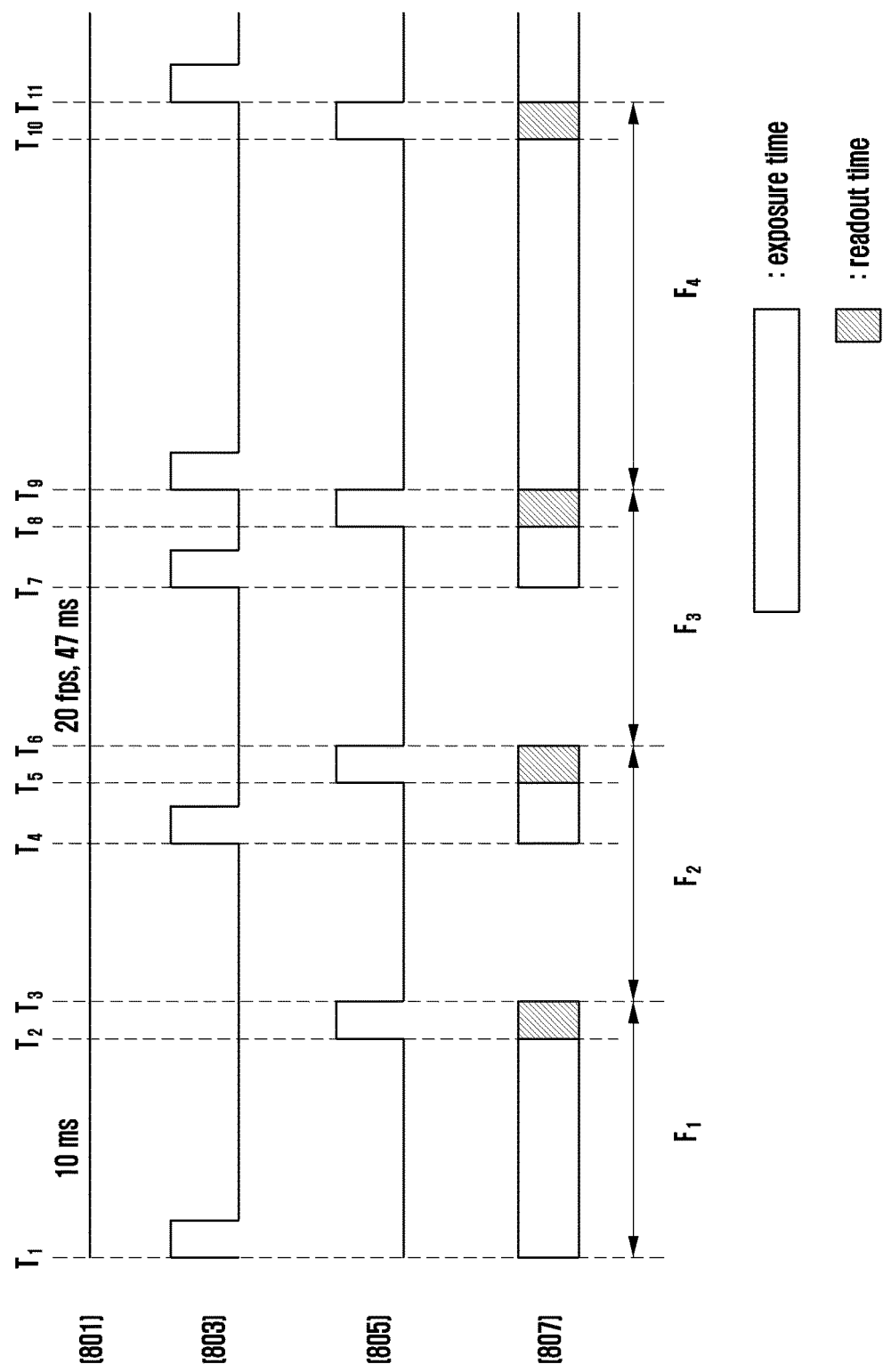

Referring to the reference numeral 803 of FIG. 8D, it can be seen that a rising edge occurs at a time point T1 in the exposure synchronization signal. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 805 of FIG. 8D, it can be seen that a rising edge occurs at a time point T2, which is a time point when the exposure time 30 ms has elapsed from the time point T1, in the readout synchronization signal. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 801 of FIG. 8D, it can be seen that the first image sensor 310 receives, from the processor 260, a control command for changing the exposure time to 10 ms between the time point T1 and the time point T3, that is, in the first frame section F1. In this case, in accordance with the control command received from the processor 260, the first image sensor 310 may generate a readout synchronization signal having an exposure time of 10 ms and the same readout period of 33 ms as that in the previous frame section.

Referring to the reference numeral 803 of FIG. 8D, it can be seen that a rising edge occurs at a time point T4 rather than at the time point T3 in the exposure synchronization signal.

In addition, referring to the reference numeral 805 of FIG. 8D, it can be seen that a rising edge occurs at a time point T5 after the changed exposure time 10 ms has elapsed from the time point T4 in the readout synchronization signal.

Referring to the reference numeral 807 of FIG. 8D, the first and second image sensors 310 and 320 may detect light outside the electronic device 300, based on the rising edge of the exposure synchronization signal at the time point T4, and read out the EHPs accumulated in each of the plurality of light sensing elements, based on the rising edge of the readout synchronization signal at the time point T5.

Meanwhile, referring to the reference numeral 801 of FIG. 8D, it can be seen that the first image sensor 310 receives, from the processor 260, a control command for changing the exposure time to 47 ms and the frame rate to 20 fps between a time point T6 and a time point T9, that is, in a third frame section F3. In this case, the first image sensor 310 may generate a readout synchronization signal having an exposure time of 47 ms and a readout period of 50 ms in accordance with the control command received from the processor 260.

Referring to the reference numeral 803 of FIG. 8D, it can be seen that a rising edge occurs at the time point T9 in the exposure synchronization signal.

Also, referring to the reference numeral 805 of FIG. 8D, it can be seen that a rising edge occurs at a time point T10 after the changed exposure time 47 ms has elapsed from the time point T9 in the readout synchronization signal.

Referring to the reference numeral 807 of FIG. 8D, the first and second image sensors 310 and 320 may detect light outside the electronic device 300, based on the rising edge of the exposure synchronization signal at the time point T9, and read out the EHPs accumulated in each of the plurality of light sensing elements, based on the rising edge of the readout synchronization signal at the time point T10.

Meanwhile, although not shown in FIGS. 8A to 8D, the readout time may include a blank time. For example, during the blank time, the first and second image sensors 310 and 320 may initialize the state of the plurality of light sensing elements to a state before detecting light.

Figure 9:
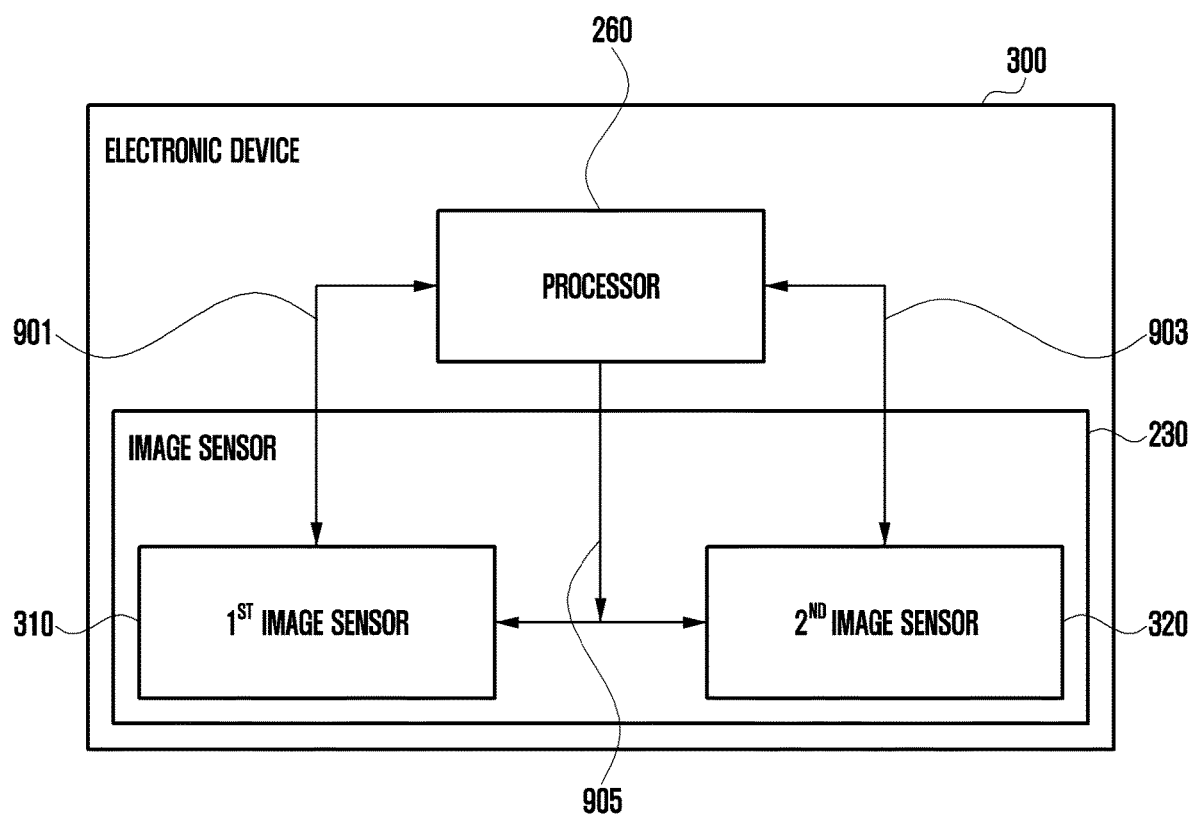
FIG. 9 is a block diagram illustrating a configuration of an electronic device according to various embodiments of the disclosure.

FIG. 9 is a block diagram illustrating a configuration of an electronic device 300 according to various embodiments of the disclosure. Descriptions duplicated with those of previously done in FIGS. 3 and 6 will be omitted below.

According to various embodiments, the electronic device 300 may include a processor 260 and an image sensor 230. According to various embodiments, the image sensor 230 may include a first image sensor 310 and a second image sensor 320.

According to various embodiments, the processor 260 may transmit a command to the first image sensor 310 and/or the second image sensor 320 by using I²C communication. For example, the processor 260 may transmit a control command to the first and second image sensors 310 and 320 through I²C interfaces 901 and 903.

The processor 260 may determine, for example, an exposure time and a readout period.

Based on the determined exposure time and readout period, the processor 260 may generate a signal corresponding to exposure and readout operations. For example, the processor 260 may generate a signal having a falling edge corresponding to a time point of starting the exposure operation and a rising edge corresponding to a time point of starting the readout operation. In another example, the processor 260 may generate a signal having a rising edge corresponding to a time point of starting the exposure operation and a falling edge corresponding to a time point of starting the readout operation.

The processor 260 may transmit the generated signal corresponding to the exposure and readout operations to the first and second image sensors 310 and 320 through an interface 905 for synchronization between the image sensors. The interface 905 for synchronization between the image sensors may refer to an interface different from the I²C interfaces 901 and 903.

According to various embodiments, the first and second image sensors 310 and 320 may receive a command from the processor 260 and perform an operation in accordance with the received command. For example, the first and second image sensors 310 and 320 may receive a control command from the processor 260 through the PC communication interfaces 901 and 905, respectively. Meanwhile, when receiving a control command from the processor 260 in the n$^{th}$ frame section, for example, each of the first and second image sensors 310 and 320 may apply the received control command to the n+1$^{th}$ frame or the n+2$^{th}$ frame.

Each of the first and second image sensors 310 and 320 may detect light outside the electronic device 300 in accordance with the signal corresponding to the exposure and readout operations received from the processor 260. For example, from a time point of the falling edge in the signal corresponding to the exposure and readout operations, each of the first and second image sensors 310 and 320 may detect light by using a plurality of light sensing elements included in each of the first and second image sensors 310 and 320.

Each of the first and second image sensors 310 and 320 may perform a readout in accordance with the signal corresponding to the exposure and readout operations received from the processor 260. For example, from a time point of the rising edge in the signal corresponding to the exposure and readout operations, each of the first and second image sensors 310 and 320 may read out EHPs accumulated in the plurality of light sensing devices, and acquire raw data for image generation, based on the readout EHPs. In addition, each of the first and second image sensors 310 and 320 may convert the raw data acquired based on the readout EHPs into digital data, and transmit the digital data to the processor 260. For example, the first and second image sensors 310 and 320 may transmit the digital data to the processor 260 through MIPI.

FIG. 10 is a flow diagram illustrating a method for acquiring data at first and second image sensors 310 and 320 by using a signal provided by a processor 260 of an electronic device 300 according to various embodiments of the disclosure. Descriptions duplicated with those of previously done in FIG. 9 will be omitted below.

According to various embodiments, at operations 1001 and 1002, the processor 260 may transmit a falling edge signal contained in the signal corresponding to the exposure and readout operations to the first and second image sensors 310 and 320. The falling edge signal may indicate a portion where the falling edge shifting from the first state to the second state occurs in the signal corresponding to the exposure and readout operations. Meanwhile, the operations 1001 and 1002 may be performed at the same time by the processor 260.

According to various embodiments, at operations 1003 and 1004, the first image sensor 310 and the second image sensor 320 may perform the exposure operation, based on the falling edge signal indicating a shift from the first state to the second state. For example, from a time point of the falling edge in the signal corresponding to the exposure and readout operations, each of the first and second image sensors 310 and 320 may detect light outside the electronic device 300 by using a plurality of pixels included therein.

According to various embodiments, at operations 1005 and 1006, the processor 260 may transmit a rising edge signal contained in the signal corresponding to the exposure and readout operations to the first and second image sensors 310 and 320. The rising edge signal may indicate a portion where the rising edge shifting from the second state to the first state occurs in the signal corresponding to the exposure and readout operations. Meanwhile, the operations 1005 and 1006 may be performed at the same time by the processor 260.

According to various embodiments, at operations 1007 and 1008, the first image sensor 310 and the second image sensor 320 may perform the readout operation, based on the rising edge signal indicating a shift from the second state to the first state. For example, from a time point of the rising edge in the signal corresponding to the exposure and readout operations, each of the first and second image sensors 310 and 320 may read out EHPs accumulated in the plurality of light sensing devices, and acquire raw data for image generation, based on the readout EHPs.

FIGS. 11A to 11D are diagrams illustrating examples of an operation of an image sensor 310 or 320 related to an exposure time and a readout timing according to various embodiments of the disclosure.

In FIGS. 11A to 11D, a reference numeral 1101 may indicate an example of a time point at which the processor 260 determines an exposure time and a readout period.

In FIGS. 11A to 11D, a reference numeral 1103 may indicate to an example of a signal corresponding to exposure and readout operations and received from the processor 260 by the first and second image sensors 310 and 320.

In FIGS. 11A to 11D, a reference numeral 1105 may indicate an example of operations of the first and second image sensors 310 and 320 in accordance with the exposure time and the readout timing. Meanwhile, each of the first and second image sensors 310 and 320 according to various embodiments may include a plurality of row lines composed of an array of pixels, and may control the operation of the pixels in units of a row line. In FIGS. 11A to 11D, an operation related to one row line will be described as an example for convenience.

In FIGS. 11A to 11D, each of the first and second image sensors 310 and 320 may be in a state where an exposure time is set to 30 ms and a frame rate is set to 30 fps before a time point T1.

Figure 11A:
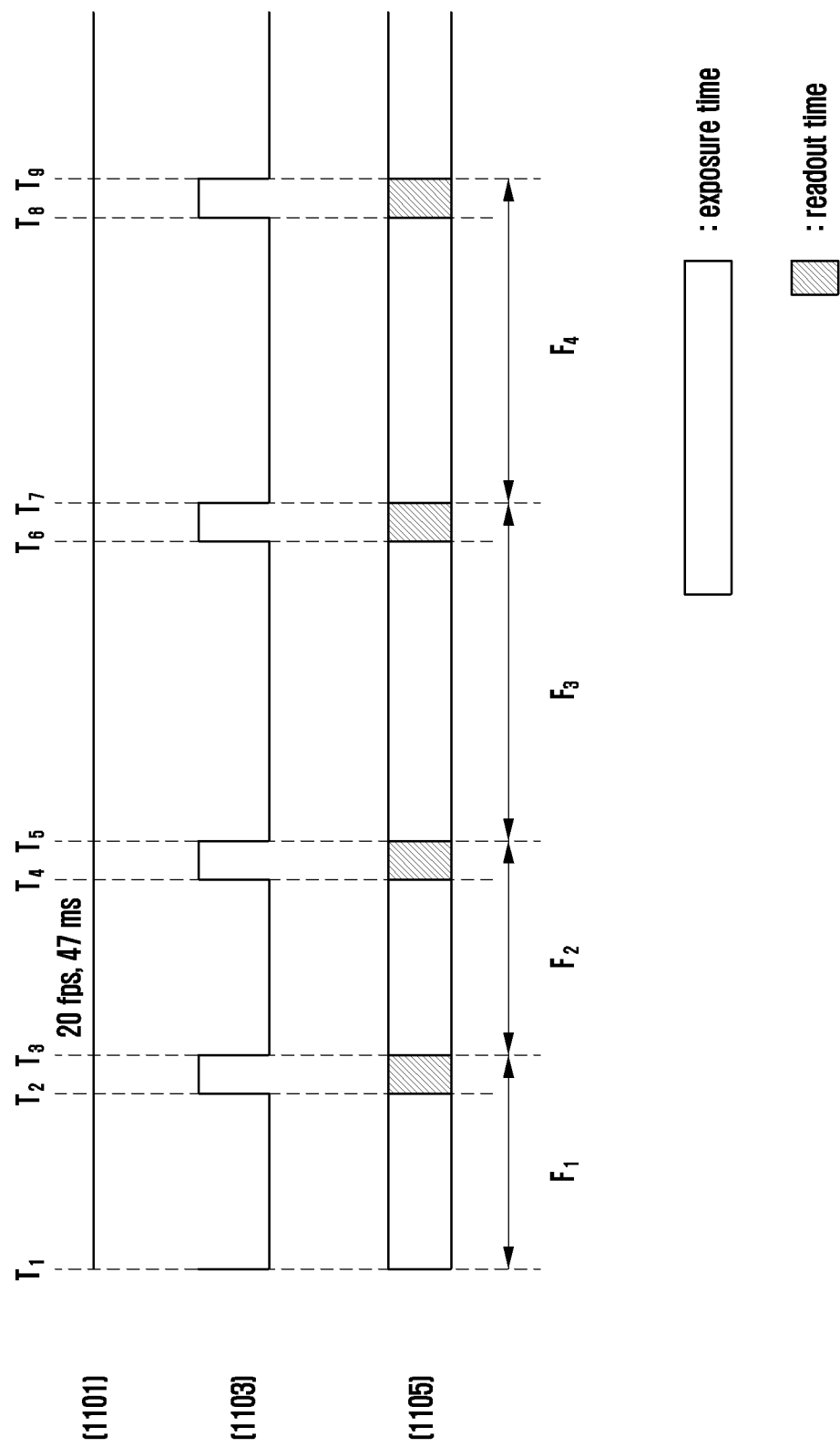
FIGS. 11A to 11D are diagrams illustrating examples of an operation of an image sensor related to an exposure time and a readout timing according to various embodiments of the disclosure.

Referring to the reference numeral 1103 of FIG. 11A, it can be seen that a falling edge occurs at the time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 1103 of FIG. 11A, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 1101 of FIG. 11A, it can be seen that the processor 260 changes the exposure time to 47 ms and the frame rate to 20 fps between the time point T3 and a time point T5, that is, in a second frame section F2. In this case, the processor 260 may determine an exposure time as 47 ms and a readout period as 50 ms and, based on the determined exposure time and readout period, generate the signal corresponding to the exposure and readout operations.

Referring to the reference numerals 1103 and 1105 of FIG. 11A, it can be seen that a falling edge occurs at the time point T5 in the signal corresponding to the exposure and readout operations, and a rising edge occurs at a time point T6 after the changed exposure time 47 ms has elapsed from the time point T5. In addition, the first and second image sensors 310 and 320 may detect light outside the electronic device 300 and read out EHPs accumulated in the plurality of light sensing elements, based on the falling edge and the rising edge.

Figure 11B:
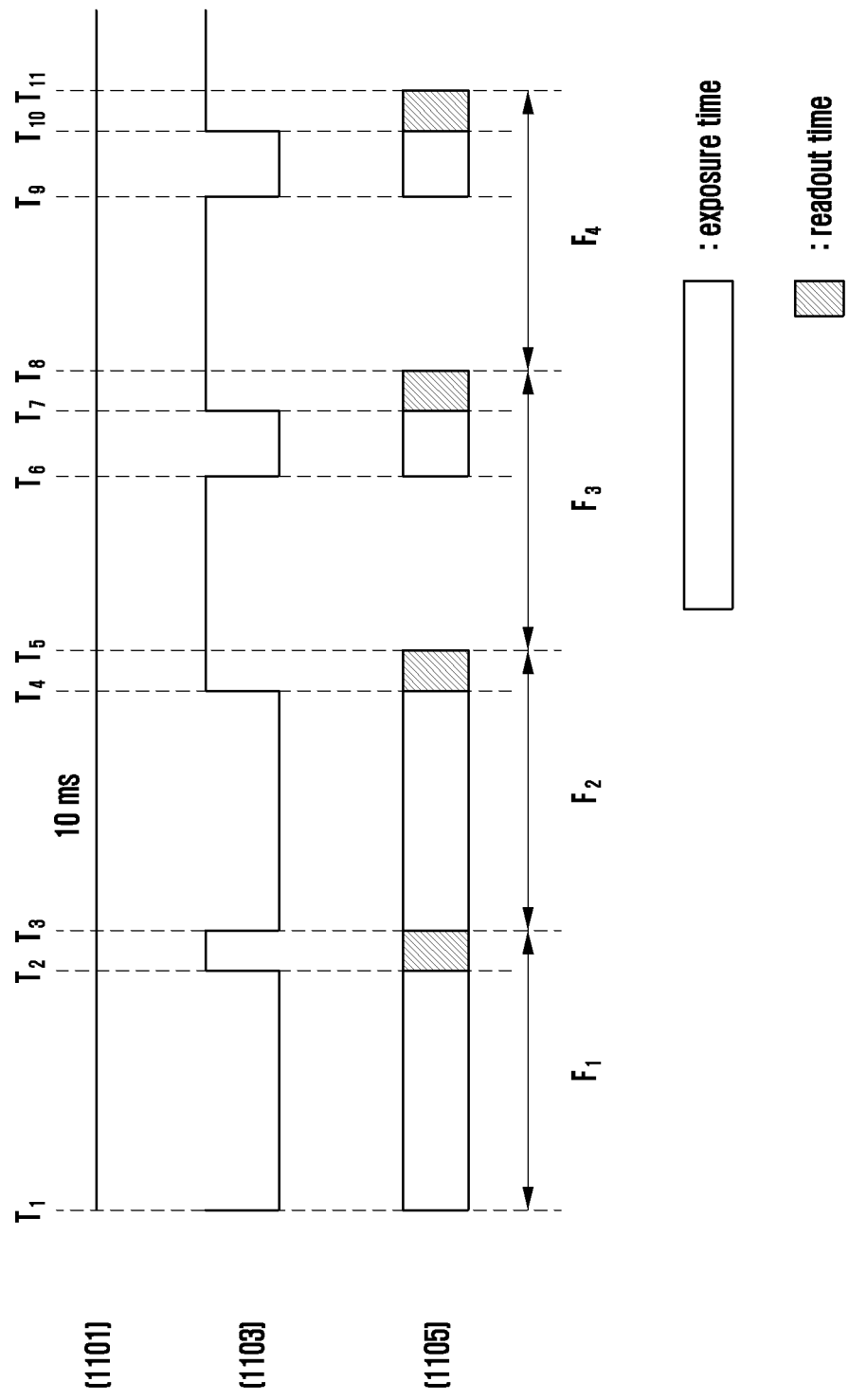

Referring to the reference numeral 1003 of FIG. 11B, it can be seen that a falling edge occurs at a time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 1105 of FIG. 11B, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 1101 of FIG. 11B, it can be seen that the processor 260 changes the exposure time to 10 ms between the time point T3 and a time point T4, that is, in a second frame section F2. In this case, the processor 260 may determine an exposure time as 10 ms and a readout period as 33 ms which is the same as that in the first frame section F1, and based on the determined exposure time and readout period, generate the signal corresponding to the exposure and readout operations.

Referring to the reference numeral 1103 of FIG. 11B, unlike the reference numeral 1103 of FIG. 11A, it can be seen that a falling edge occurs at a time point T6 rather than at a time point T5 in the signal corresponding to the exposure and readout operations. In addition, it can be seen that a rising edge occurs at a time point T7 after the changed exposure time 10 ms has elapsed from the time point T6 in the signal corresponding to the exposure and readout operations.

Referring to the reference numeral 1105 of FIG. 11B, the first and second image sensors 310 and 320 may detect light outside the electronic device 300, based on the falling edge at the time point T6, and read out the EHPs accumulated in each of the plurality of light sensing elements, based on the rising edge at the time point T7.

Meanwhile, it can be seen that all of the first frame section F1 to the fourth frame section F4 are as 33 ms corresponding to 30 fps which is the frame rate previously set before the time point T1.

Figure 11C:
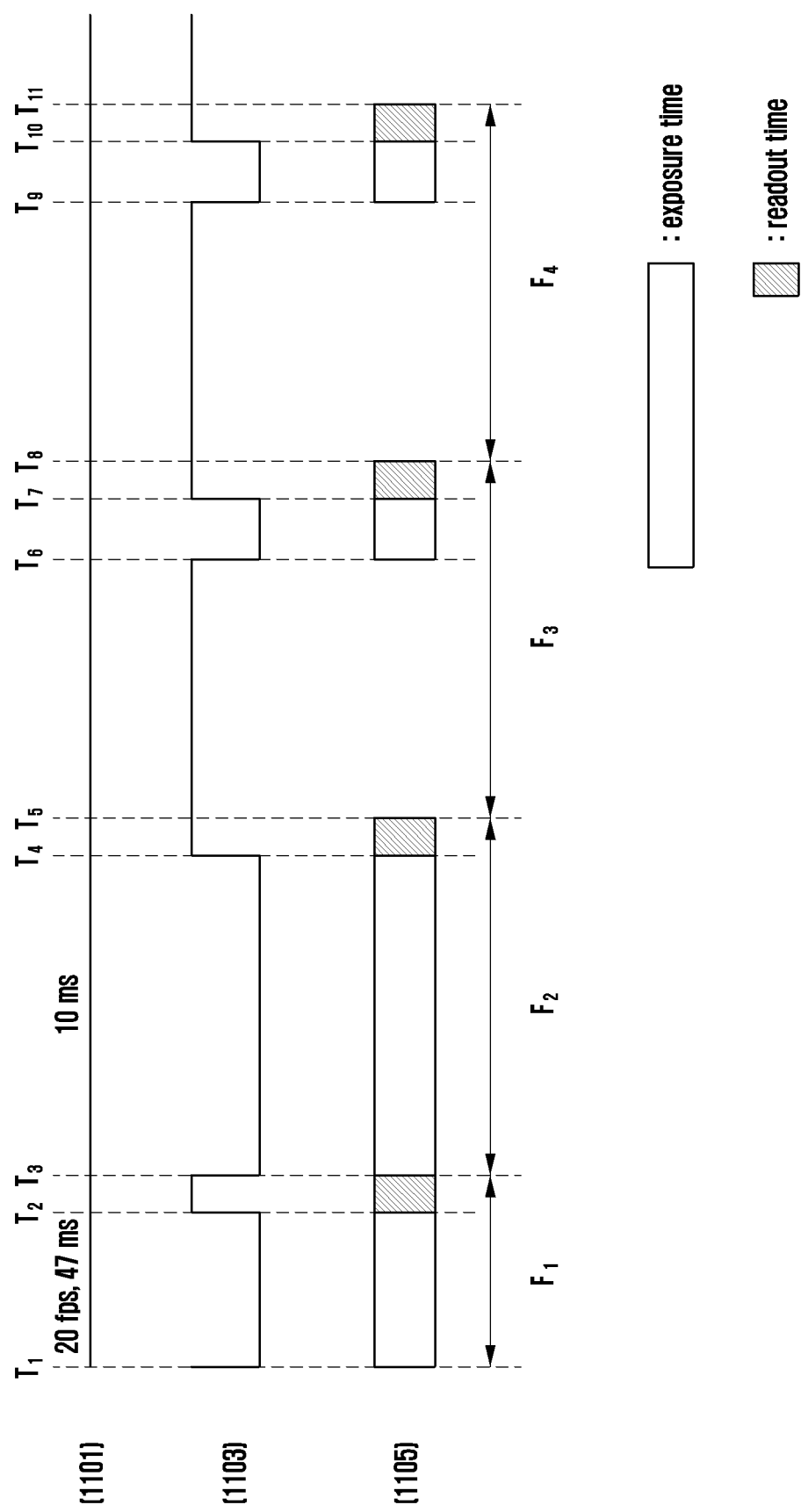

Referring to the reference numeral 1103 of FIG. 11C, it can be seen that a falling edge occurs at a time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 1103 of FIG. 11C, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 1101 of FIG. 11C, it can be seen that the processor 260 changes the exposure time to 47 ms and the frame rate to 20 fps between the time point T1 and the time point T3, that is, in the first frame section F1. In this case, the processor 260 may determine an exposure time as 47 ms and a readout period as 50 ms and, based on the determined exposure time and readout period, generate the signal corresponding to the exposure and readout operations.

Referring to the reference numeral 1103 of FIG. 11C, it can be seen that a falling edge occurs at the time point T3 in the signal corresponding to the exposure and readout operations. Also, it can be seen that a rising edge occurs at a time point T4 after the changed exposure time 47 ms has elapsed from the time point T3 in the signal corresponding to the exposure and readout operations.

Referring to the reference numeral 1105 of FIG. 11C, the first and second image sensors 310 and 320 may detect light outside the electronic device 300, based on the falling edge at the time point T3, and read out the EHPs accumulated in each of the plurality of light sensing elements, based on the rising edge at the time point T4.

Meanwhile, referring to the reference numeral 1101 of FIG. 11C, it can be seen that the processor 260 changes the exposure time to 10 ms between the time point T3 and a time point T5, that is, in a second frame section F2. In this case, the processor 260 may determine an exposure time as 10 ms and a readout period as 50 ms which is the same as that in the second frame section F2 and, based on the determined exposure time and readout period, generate the signal corresponding to the exposure and readout operations.

Referring to the reference numeral 1103 of FIG. 11C, it can be seen that a falling edge occurs at a time point T6 rather than at the time point T5 in the signal corresponding to the exposure and readout operations. In addition, it can be seen that a rising edge occurs at a time point T7 after the changed exposure time 10 ms has elapsed from the time point T6 in the signal corresponding to the exposure and readout operations.

Referring to the reference numeral 1105 of FIG. 11C, the first and second image sensors 310 and 320 may detect light outside the electronic device 300, based on the falling edge at the time point T6, and read out the EHPs accumulated in each of the plurality of light sensing elements, based on the rising edge at the time point T7.

Figure 11D:
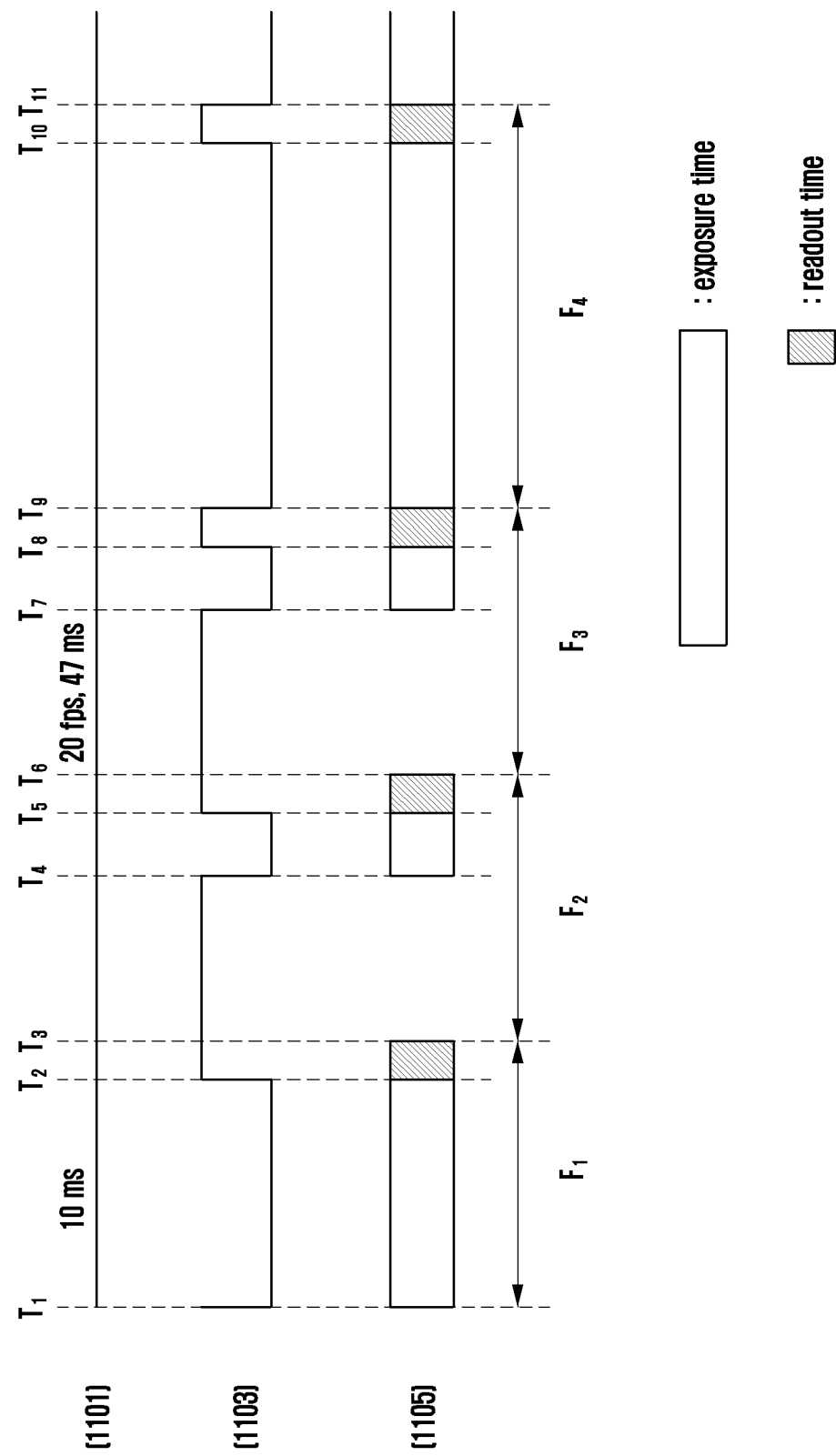

Referring to the reference numeral 1103 of FIG. 11D, it can be seen that a falling edge occurs at a time point T1 in the signal corresponding to the exposure and readout operations. At this time, the first and second image sensors 310 and 320 may detect light outside the electronic device 300 from the time point T1, and a plurality of light sensing elements included in each of the first and second image sensors 310 and 320 may accumulate EHPs from the detected light.

Referring to the reference numeral 1103 of FIG. 11D, it can be seen that a rising edge occurs at a time point T2, which is a time point when the exposure time 30 ms has elapsed from the time point T1, in the signal corresponding to the exposure and readout operations. At this time, the first and second image sensors 310 and 320 may read out the EHPs accumulated in each of the plurality of light sensing elements from the time point T2. In addition, the first and second image sensors 310 and 320 may perform a readout from the time point T2 to a time point T3. Meanwhile, a first frame section F1 may be 33 ms corresponding to 30 fps which is the frame rate previously set before the time point T1.

Meanwhile, referring to the reference numeral 1101 of FIG. 11D, it can be seen that processor 260 changes the exposure time to 10 ms between the time point T1 and the time point T3, that is, in the first frame section F1. In this case, the processor 260 may determine an exposure time as 10 ms and a readout period as 33 ms which is the same as that in the previous frame section and, based on the determined exposure time and readout period, generate the signal corresponding to the exposure and readout operations.

Referring to the reference numeral 1103 of FIG. 11D, it can be seen that a falling edge occurs at a time point T4 rather than at the time point T3 in the signal corresponding to the exposure and readout operations. In addition, it can be seen that a rising edge occurs at a time point T5 after the changed exposure time 10 ms has elapsed from the time point T4 in the signal corresponding to the exposure and readout operations.

Referring to the reference numeral 1105 of FIG. 11D, the first and second image sensors 310 and 320 may detect light outside the electronic device 300, based on the falling edge at the time point T4, and read out the EHPs accumulated in each of the plurality of light sensing elements, based on the rising edge at the time point T5.

Meanwhile, referring to the reference numeral 1101 of FIG. 11D, it can be seen that the processor 260 changes the exposure time to 47 ms and the frame rate to 20 fps between a time point T6 and a time point T9, that is, in a third frame section F3. In this case, the processor 260 may determine an exposure time as 47 ms and a readout period as 50 ms and, based on the determined exposure time and readout period, generate the signal corresponding to the exposure and readout operations.

Referring to the reference numeral 1103 of FIG. 11D, it can be seen that a falling edge occurs at the time point T9 in the signal corresponding to the exposure and readout operations. Also, it can be seen that a rising edge occurs at a time point T10 after the changed exposure time 47 ms has elapsed from the time point T9 in the signal corresponding to the exposure and readout operations.

Referring to the reference numeral 1105 of FIG. 11D, the first and second image sensors 310 and 320 may detect light outside the electronic device 300, based on the falling edge at the time point T9, and read out the EHPs accumulated in each of the plurality of light sensing elements, based on the rising edge at the time point T10.

Meanwhile, although not shown in FIGS. 11A to 11D, the readout time may include a blank time. For example, during the blank time, the first and second image sensors 310 and 320 may initialize the state of the plurality of light sensing elements to a state before detecting light.

While the present disclosure has been described with reference to various embodiments, these embodiments are merely provided to assist in a comprehensive understanding of the present disclosure and are not intended to limit the present disclosure. Therefore, it should be understood by those skilled in the art, that various changes in form and detail may be made without departing from the spirit and scope of the present disclosure, which is defined, not by the detailed description and embodiments, but by the appended claims and their equivalents.

The invention claimed is:

1. An electronic device comprising:
    a first image sensor; and
    a second image sensor electrically connected to the first image sensor through a designated first interface and a designated second interface,
    wherein the second image sensor is configured to:
    receive, from the first image sensor through the first interface, a first signal shifting from a first state to a second state,
    while the first image sensor detects light outside the electronic device through a plurality of first pixels contained in the first image sensor, detect the light through a plurality of second pixels contained in the second image sensor, based on at least the first signal,
    receive, from the first image sensor through the second interface, a second signal shifting from a third state to a fourth state, and
    while the first image sensor acquires first data corresponding to the light detected through the plurality of first pixels, acquire second data corresponding to the light detected through the plurality of second pixels, based on at least the second signal.

2. The electronic device of claim 1, further comprising:
a processor functionally connected to the first and second image sensors,
wherein the processor is configured to transmit a control command associated with at least one of an exposure time and a readout timing to the first image sensor.

3. The electronic device of claim 2, wherein the processor is configured to transmit the control command associated with at least one of the exposure time and the readout timing to the first image sensor through inter-integrated circuit (I2C) communication or serial peripheral interface (SPI) communication.

4. The electronic device of claim 2, further comprising:
a display functionally connected to the processor,
wherein the processor is configured to:
receive the first data from the first image sensor,
receive the second data from the second image sensor, and
display an image based on at least one of the first data and the second data through the display.

5. The electronic device of claim 2, wherein the processor is configured to receive the first data and the second data through a mobile industry processor interface (MIPI).

6. The electronic device of claim 1, wherein the first and second image sensors are configured to start at least one of operations of detecting the light at a time point when the first signal shifts from the first state to the second state and of acquiring the first and second data corresponding to the light at a time point when the second signal shifts from the third state to the fourth state.

* * * * *